US011143798B2

(12) United States Patent
Chou et al.

(10) Patent No.: US 11,143,798 B2
(45) Date of Patent: *Oct. 12, 2021

(54) DUAL-MOLDED CIRCULAR OPTICAL ELEMENT, IMAGING LENS ASSEMBLY, IMAGING DEVICE, AND ELECTRONIC DEVICE

(71) Applicant: LARGAN PRECISION CO., LTD., Taichung (TW)

(72) Inventors: Ming-Ta Chou, Taichung (TW); Cheng-Feng Lin, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 250 days.

This patent is subject to a terminal disclaimer.

(21) Appl. No.: 16/535,150

(22) Filed: Aug. 8, 2019

(65) Prior Publication Data
US 2019/0361154 A1 Nov. 28, 2019

Related U.S. Application Data

(63) Continuation of application No. 15/677,103, filed on Aug. 15, 2017, now Pat. No. 10,422,932.

(30) Foreign Application Priority Data

May 25, 2017 (TW) .................. 106117446

(51) Int. Cl.
| G02B 5/00 | (2006.01) |
| G02B 7/00 | (2021.01) |
| G02B 7/02 | (2021.01) |
| G02B 13/00 | (2006.01) |

(52) U.S. Cl.
CPC ............. *G02B 5/005* (2013.01); *G02B 7/006* (2013.01); *G02B 7/021* (2013.01); *G02B 13/001* (2013.01)

(58) Field of Classification Search
CPC ........ G02B 5/005; G02B 5/003; G02B 5/006; G02B 5/22; G02B 5/26; G02B 7/006; G02B 7/02; G02B 7/021; G02B 7/022; G02B 13/001; G02B 13/0055; G02B 26/02; G02B 27/0018; G02B 27/58
USPC ................................. 359/738–740
See application file for complete search history.

(56) References Cited

U.S. PATENT DOCUMENTS

| 10,422,932 B2 * | 9/2019 | Chou ..................... G02B 5/005 |
| 2006/0061884 A1 | 3/2006 | Chuman |
| 2011/0109969 A1 * | 5/2011 | Ogasawara ............ G02B 7/021 |
| | | 359/601 |
| 2011/0279913 A1 | 11/2011 | Watanabe |
| 2012/0194730 A1 | 8/2012 | Morooka et al. |

(Continued)

*Primary Examiner* — Jordan M Schwartz
(74) *Attorney, Agent, or Firm* — McClure, Qualey & Rodack, LLP

(57) ABSTRACT

The present disclosure provides a dual-molded circular optical element including an outer plastic peripheral portion and an inner sheet portion. The outer plastic peripheral portion locates at an outer annular surface of the circular optical element. The inner sheet portion is enclosed in the outer plastic peripheral portion, and the inner sheet portion forms a minimal central opening of the circular optical element. Two sides of the outer plastic peripheral portion are disposed with a flat plane, and each of the flat planes is perpendicular to a central axis of the circular optical element.

18 Claims, 22 Drawing Sheets

(56) References Cited

U.S. PATENT DOCUMENTS

| | | | |
|---|---|---|---|
| 2014/0104691 A1* | 4/2014 | Chang | G02B 13/0035 |
| | | | 359/611 |
| 2015/0172521 A1* | 6/2015 | Yasukochi | G02B 7/021 |
| | | | 348/373 |
| 2015/0185366 A1 | 7/2015 | Bone et al. | |
| 2016/0313472 A1 | 10/2016 | Huang et al. | |
| 2017/0115481 A1 | 4/2017 | Lin et al. | |
| 2018/0081149 A1 | 3/2018 | Bae et al. | |

* cited by examiner

795

740 ———— — ————

DUAL-MOLDED CIRCULAR OPTICAL ELEMENT, IMAGING LENS ASSEMBLY, IMAGING DEVICE, AND ELECTRONIC DEVICE

RELATED APPLICATIONS

This application is a continuation of U.S. application Ser. No. 15/677,103, filed on Aug. 15, 2017, which claims priority to Taiwan Application Serial Number 106117446, filed May 25, 2017, which is herein incorporated by reference.

BACKGROUND

Technical Field

The present disclosure relates to a dual-molded circular optical element, an imaging lens assembly, and an imaging device. More particularly, the present disclosure relates to a dual-molded circular optical element, an imaging lens assembly, an imaging device, and an electronic device that can be applied to a portable electronic device.

Description of Related Art

Along with the popularization of personal electronic products and mobile communication products (such as mobile phones and tablets) having imaging devices, miniaturized imaging lens modules have been correspondingly risen and developed, and the demands of miniaturized imaging lens modules having high resolution and great imaging quality significantly increased as well.

A plastic barrel is usually used to receive the lens elements in a camera module and provides an optical distance between any two of the lens elements, and the structure of the plastic barrel correspondingly affects the imaging quality of the camera module.

FIG. 1 is a schematic view of a conventional imaging device 100. In the imaging device 100 of FIG. 1, the position of a conventional inner sheet portion 10 (e.g., a light blocking sheet) is fixed and limited to be near a lens element 12. However, the inner sheet portion 10 made of plastic material may reflect the light from an object-end opening 11 as a stray light, such that the imaging quality may be deteriorated.

Therefore, to people having ordinary skills in the art, it is crucial to design an optical element that is capable of avoiding the above issue.

SUMMARY

The present disclosure provides a dual-molded circular optical element including an outer plastic peripheral portion and an inner sheet portion. The outer plastic peripheral portion is located at an outer annular surface of the dual-molded circular optical element. The inner sheet portion is enclosed in the outer plastic peripheral portion, and the inner sheet portion forms a minimal central opening of the dual-molded circular optical element. Two sides of the outer plastic peripheral portion are respectively disposed with at least one flat plane, and each of the flat planes is perpendicular to a central axis of the dual-molded circular optical element. Distances between a central cross-sectional plane of the inner sheet portion and the flat planes of the two sides are t1 and t2, and the following condition is satisfied: $0.2 < t1/t2 < 5.0$.

The present disclosure provides an optical lens assembly including the aforementioned dual-molded circular optical element.

The present disclosure provides an imaging device including a plastic barrel and the aforementioned optical lens assembly. The optical lens assembly is disposed in the plastic barrel.

The present disclosure provides an electronic device including the aforementioned imaging device and an image sensor. The image sensor is disposed on an image surface of the imaging device.

BRIEF DESCRIPTION OF THE DRAWINGS

The present disclosure can be more fully understood by reading the following detailed description of the embodiment, with reference made to the accompanying drawings as follows.

DETAILED DESCRIPTION

1st Embodiment

Figure 1:
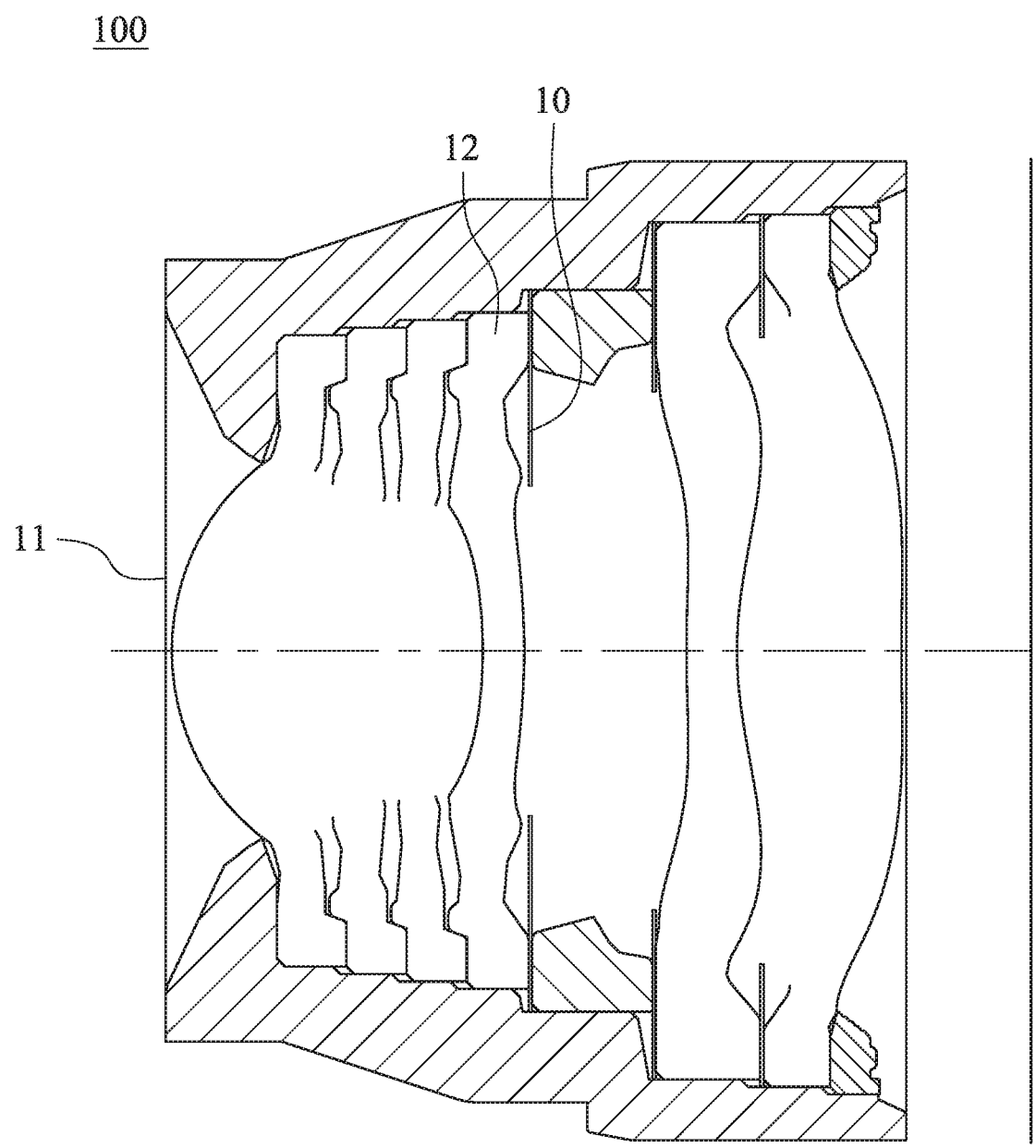
FIG. 1 is a schematic view of a conventional imaging device.
Figure 2A:
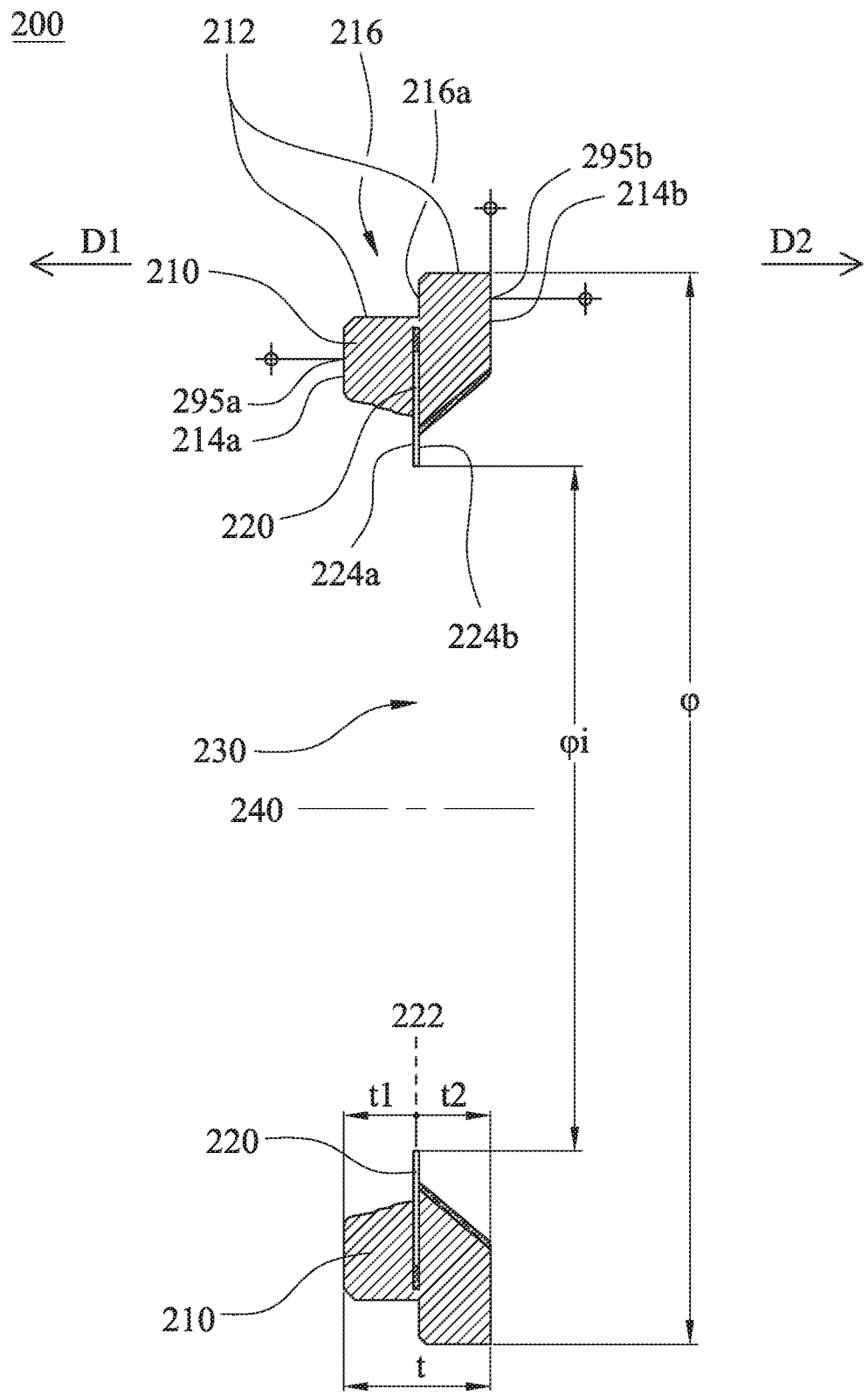
FIG. 2A is a side cross-sectional view of a dual-molded circular optical element of the 1st embodiment of the present disclosure.

FIG. 2A is a side cross-sectional view of a dual-molded circular optical element 200 of the 1st embodiment of the present disclosure. In FIG. 2A, the dual-molded circular optical element 200 includes an outer plastic peripheral portion 210 and an inner sheet portion 220. The outer plastic peripheral portion 210 is located at an outer annular surface 212 of the dual-molded circular optical element 200. The inner sheet portion 220 is enclosed in the outer plastic peripheral portion 210, and the inner sheet portion 220 forms a minimal central opening 230 of the dual-molded circular optical element 200. In the present embodiment, the inner sheet portion 220 is, for example, a thin light blocking sheet with a uniform thickness (represented by d) which ranges between 0.05 mm and 0.005 mm (e.g., d=0.023 mm), but the present disclosure is not limited thereto. Two sides of the outer plastic peripheral portion 210 are respectively disposed with flat planes 214a and 214b, and each of the flat planes 214a and 214b is perpendicular to a central axis 240 of the dual-molded circular optical element 200.

When distances between a central cross-sectional plane 222 of the inner sheet portion 220 and the flat planes 214a and 214b of the two sides are t1 and t2, the following condition is satisfied: 0.2<t1/t2<5.0. Accordingly, when the dual-molded circular optical element 200 is disposed in an imaging lens assembly, the light blocking position of the inner sheet portion 220 can be distant from the lens element by at least t1 or t2, which leads to a stacking way different from the conventional way. Therefore, the stray light can be reduced to improve the Imaging quality. Preferably, the following condition can be satisfied: 0.25<t1/t2<4.0. Accordingly, the proportion of the thickness of the dual-molded circular optical element 200 can be better configured, such that the dual-molded circular optical element 200 with less thickness can be manufactured.

In FIG. 2A, when a height of the dual-molded circular optical element 200 parallel to the central axis 240 is t, a diameter of the minimal central opening 230 is φi, and a thickness of the inner sheet portion 220 is d, the following condition can be satisfied: 0.5<(t×t)/(φi×d)<45.0. Accordingly, the overall balance of the dual-molded circular optical element 200 can be better maintained, which makes the dual-molded circular optical element 200 more applicable to optical cameras with various angles of view and specifications. Preferably, the following condition can be satisfied: 2.0<(t×t)/(φi×d)<17.0. Accordingly, the overall balance of the dual-molded circular optical element 200 can be even better maintained, which makes the dual-molded circular optical element 200 more applicable to optical camera with various angles of view and specifications Additionally, in FIG. 2A, the outer plastic peripheral portion 210 may include a stair structure 216 disposed on the outer annular surface 212. The stair structure 216 may have a plane 216a that is perpendicular to the central axis 240.

That is, the outer plastic peripheral portion 210 has at least two outer diameters, such that the appearance of the outer annular surface 212 may be configured with a height difference. Accordingly, it is less possible for the appearance of the outer plastic peripheral portion 210 to have flaws during the first and the second Injection molding processes.

Furthermore, when a maximum outer diameter of the outer annular surface 212 is φ, and a diameter of the minimal central opening 230 is φi, the following condition can be satisfied: 0.4<φi/φ<0.8. Accordingly, the proportion between the outer annular surface 212 and the minimal central opening 230 can be better maintained, such that it is less possible for the position of the minimal central opening 230 on the inner sheet portion 220 to be deviated.

In addition, when a thickness of the inner sheet portion 220 is d, and the distance between the central cross-sectional plane 222 of the inner sheet portion 220 and the flat plane 214a of one of the two sides is t1, the following condition can be satisfied: $0.2<(\pi^2 \times d)/t1<3.0$. Accordingly, the dual-molded circular optical element 200 can be disposed with the inner sheet portion 220 with less thickness.

In FIG. 2A, the outer plastic peripheral portion 210 includes an object-end surface (e.g., the flat plane 214a) facing an object-end direction D1 and an image-end surface (e.g., the flat plane 214b) facing an image-end direction D2. Moreover, the inner sheet portion 220 includes an object-end surface 224a facing the object-end direction D1 and an image-end surface 224b facing the image-end direction D2. The object-end surface 224a of the inner sheet portion 220 has a first gloss GU1 and the image-end surface 224b of the inner sheet portion 220 has a second gloss GU2, wherein the first gloss GU1 is different from the second gloss GU2. Accordingly, the front and back of the inner sheet portion 220 can be identified more easily, which facilitates the following operations performed to inner sheet portion 220 for forming the minimal central opening 230. Preferably, the following conditions can be satisfied: 0%<GU1<1.8%; and 2.0%<GU2<9.0%. Accordingly, the front and back of the inner sheet portion 220 can be identified by human eyes and industrial cameras.

In the 1st embodiment, the outer plastic peripheral portion 210 is a black plastic made by a dual-molded injection molding process. Accordingly, the tolerance existing during the process of assembling conventional parts can be mitigated with the precisely-designed mold of the injection molding machine. Details about manufacturing the outer plastic peripheral portion 210 with the dual-molded injection molding process may be referred to the following descriptions of FIG. 2B.

Figure 2B:
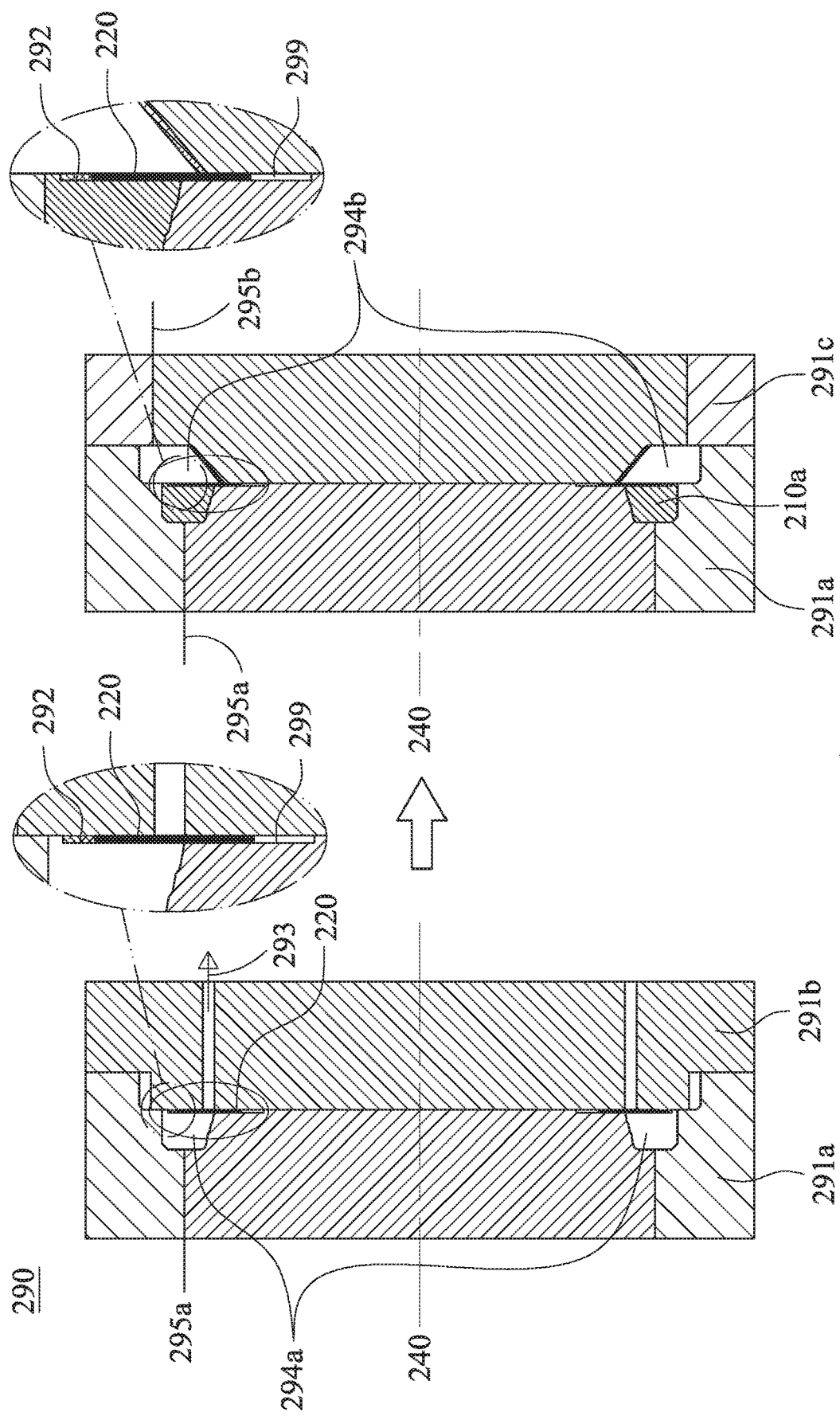
FIG. 2B is a cross-sectional view of a mold used in the dual-molded injection molding process of the dual-molded circular optical element of FIG. 2A.

FIG. 2B is a cross-sectional view of a mold 290 used in the dual-molded injection molding process of the dual-molded circular optical element 200 of FIG. 2A. The dual-molded injection process includes a first injection molding process and a second injection molding process. In FIG. 2B, in the first injection molding process, the mold 290 may be used to form a part of the outer plastic peripheral portion 210. Specifically, the mold 290 may include a movable side 291a and a fixed side 291b. The movable side 291a and the fixed side 291b may cooperatively clamp the inner sheet portion 220, and the inner sheet portion 220 may be fixated by the suction from a suction channel 293. Next, the injection molding machine may inject the plastic into a chamber 294a, such that the plastic may be hardened to be the part of the outer plastic peripheral portion 210.

In FIG. 2B, a surface treatment area 292 may be disposed in the outer plastic peripheral portion 210 for making the minimal central opening 230 of the inner sheet portion 220 aligned with the outer annular surface 212 of the outer plastic peripheral portion 210 and coaxial with each other. Specifically, the surface treatment area 292 in the mold 290 may be a specific inner chamber surface corresponding to the outer plastic peripheral portion 210. The surface treatment area 292 can be treated by surface-treating processes such as atomization, sandblasting, EDM discharge, laser-related etching, or machining tool. The surface treatment area 292 may be an area with preserved thickness, which not only facilitates the surface-treating processes, but keeps the inner sheet portion 220 put inside the mold 290 fixed during the injection molding process. Accordingly, the molding quality of the dual-molded circular optical element 200 can be better, which accelerates the mass production of the dual-molded circular optical element 200. In one embodiment, when a surface roughness of the surface treatment area 292 is Ra, the following condition can be satisfied: $0.1\ \mu m < Ra < 3.5\ \mu m$. Accordingly, the engagement between the plastics of the first and the second Injection molding process can be improved.

The dual-molded circular optical element 200 may further include a perpendicular parting surface 295a disposed at the object-end surface (e.g., the flat plane 214a) of the outer plastic peripheral portion 210, and the perpendicular parting surface 295a is closer to the central axis 240 than the outer annular surface 212 is thereto.

During the second injection molding process, the fixed side 291b may be replaced with a fixed side 291c, and the plastic may be injected into a chamber 294b, such that the plastic may be hardened to be another part of the outer plastic peripheral portion 210. In FIG. 2B, the dual-molded circular optical element 200 may further include a perpendicular parting surface 295b disposed at the image-end surface (e.g., the flat plane 214b) of the outer plastic peripheral portion 210, and the perpendicular parting surface 295b is closer to the central axis 240 than the outer annular surface 212 is thereto.

In the 1st embodiment, the inner sheet portion 220 may include a black material containing carbon. Accordingly, it is less possible for the appearance of the inner sheet portion 220 to reflect lights, such that the imaging quality may be improved. Besides, the inner sheet portion 220 may be integrally formed t10 with the outer plastic peripheral portion 210 via an Insert molding process. Accordingly, the alignment between the center of the minimal central opening 230 and the center of the outer annular surface 212 may be better controlled at an initial stage of the injection molding process via the mold 290 which is precisely designed. It is noted that a part (i.e., a slim space 299 between the inner sheet portion 220 and the mold 290 of FIG. 2B) of the minimal central opening 230 has no contact with the mold 290 for avoiding the minimal central opening 230 to be accidentally affected during the manufacturing process.

Figure 2C:
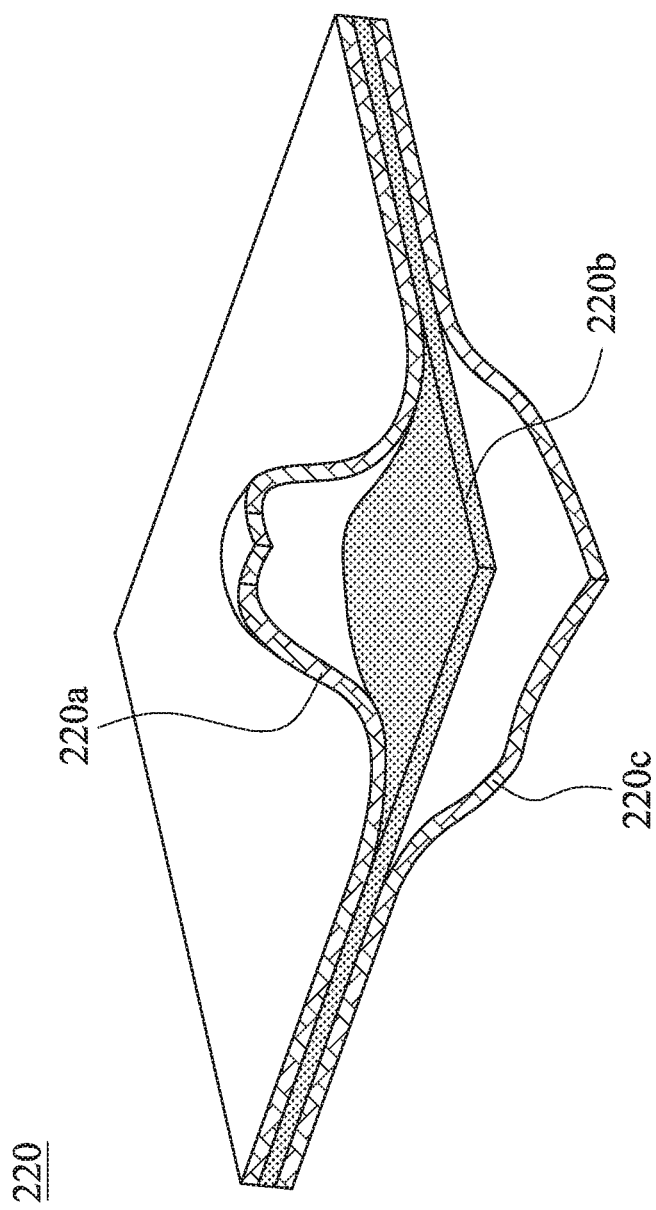
FIG. 2C is a schematic view of the inner sheet portion of the 1st embodiment of the present disclosure.

FIG. 2C is a schematic view of the inner sheet portion 220 of the 1st embodiment of the present disclosure. In FIG. 2C, the inner sheet portion 220 may be a sheet-shaped material that includes a first surface layer 220a, a central layer 220b, and a second surface layer 220c. In various embodiments, the sheet-shaped material may be punched or not punched. Noted that the layers of the inner sheet portion 220 of FIG. 2C is illustrated as a non-closely attached status for better understanding the structure of the inner sheet portion 220, but the layers of the inner sheet portion 220 should be closely attached with each other.

The following Table 1 lists the data of the dual-molded circular optical element 200 defined according to the aforementioned parameters of the 1st embodiment of the present disclosure as shown in FIG. 2A.

TABLE 1

| 1st embodiment | | | |
|---|---|---|---|
| d | 0.023 mm | φi | 3.1 mm |
| φ | 4.85 mm | t | 0.663 mm |
| t1 | 0.327 mm | t2 | 0.336 mm |
| GU1 | 0.4% | GU2 | 3.0% |
| (t × t)/(φi × d) | 6.165 | | |

Figure 3A:
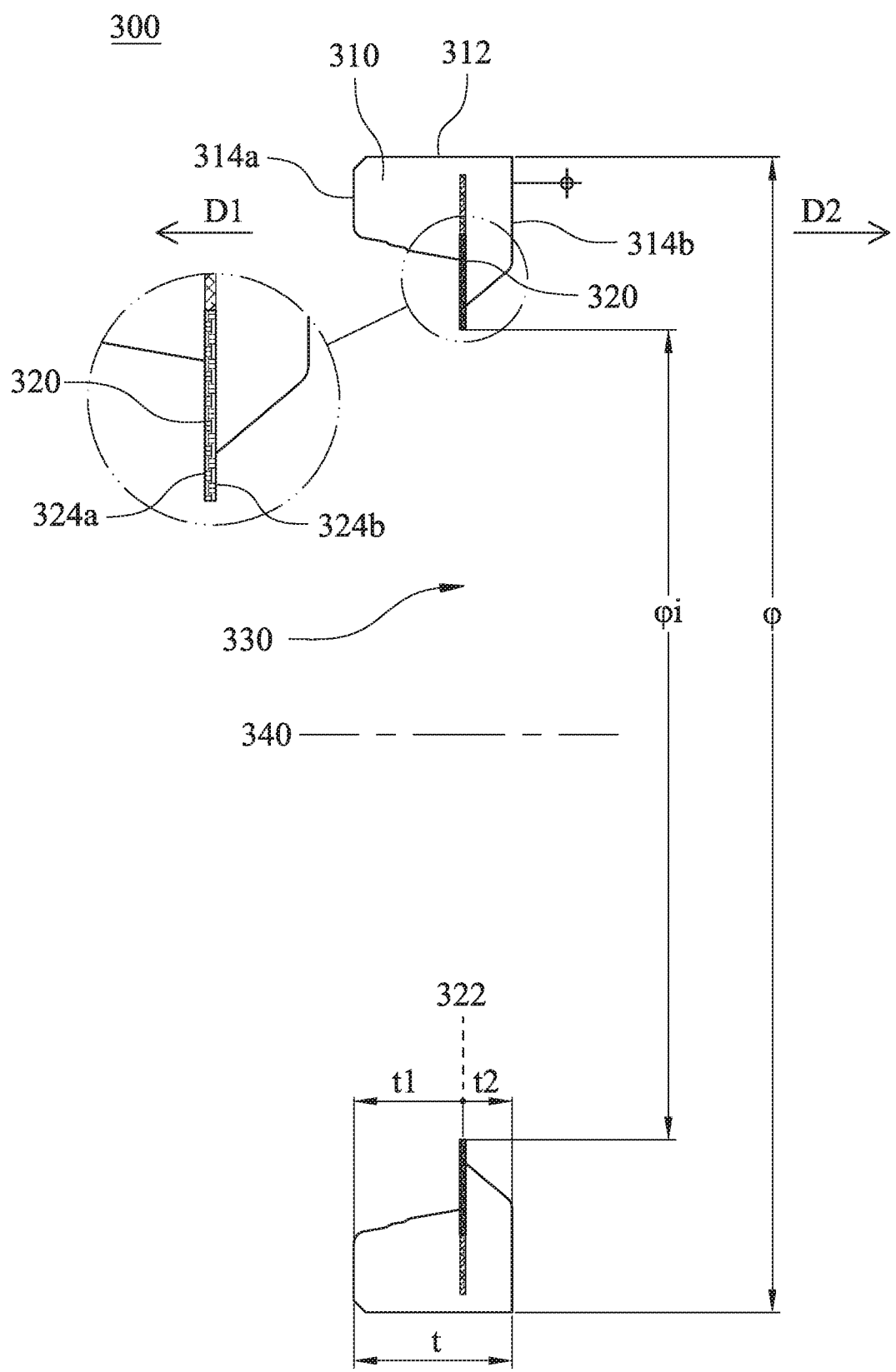
FIG. 3A is a side cross-sectional view of a dual-molded circular optical element of the 2nd embodiment of the present disclosure.

FIG. 3A is a side cross-sectional view of a dual-molded circular optical element 300 of the 2nd embodiment of the present disclosure. In FIG. 3A, the dual-molded circular optical element 300 includes an outer plastic peripheral portion 310 and an inner sheet portion 320. The outer plastic peripheral portion 310 is located at an outer annular surface 312 of the dual-molded circular optical element 300. The inner sheet portion 320 is enclosed in the outer plastic peripheral portion 310, and the inner sheet portion 320 forms a minimal central opening 330 of the dual-molded circular optical element 300. Two sides of the outer plastic peripheral portion 310 are respectively disposed with flat planes 314a and 314b, and each of the flat planes 314a and 314b is perpendicular to a central axis 340 of the dual-molded circular optical element 300.

When distances between a central cross-sectional plane 322 of the inner sheet portion 320 and the flat planes 314a and 314b of the two sides are t1 and t2, the following condition is satisfied: $0.2 < t1/t2 < 5.0$. Preferably, the following condition can be satisfied: $0.25 < t1/t2 < 4.0$.

In FIG. 3A, when a height of the dual-molded circular optical element 300 parallel to the central axis 340 is t, a diameter of the minimal central opening 330 is φi, and a thickness of the inner sheet portion 320 is d, the following condition can be satisfied: $0.5 < (t \times t)/(\varphi i \times d) < 45.0$. Preferably, the following condition can be satisfied: $2.0 < (t \times t)/(\varphi i \times d) < 17.0$.

Furthermore, when a maximum outer diameter of the outer annular surface 312 is φ, and a diameter of the minimal central opening 330 is φi, the following condition can be satisfied: $0.4 < \varphi i/\varphi < 0.8$. In addition, when a thickness of the inner sheet portion 320 is d, the distance between the central cross-sectional plane 322 of the inner sheet portion 320 and the flat plane 314a of one of the two sides is t1, the following condition can be satisfied: $0.2 < (\pi^2 \times d)/t1 < 3.0$.

In FIG. 3A, the outer plastic peripheral portion 310 includes an object-end surface (e.g., the flat plane 314a) facing an object-end direction D1 and an image-end surface (e.g., the flat plane 314b) facing an image-end direction D2. Moreover, the inner sheet portion 320 includes an object-end surface 324a facing the object-end direction D1 and an image-end surface 324b facing the image-end direction D2. The object-end surface 324a of the inner sheet portion 320 has a first gloss GU1 and the image-end surface 324b of the inner sheet portion 320 has a second gloss GU2, wherein the first gloss GU1 is different from the second gloss GU2. Preferably, the following conditions can be satisfied: $0\% < GU1 < 1.8\%$; and $2.0\% < GU2 < 9.0\%$.

In one embodiment, the outer plastic peripheral portion 310 is a black plastic made by a dual-molded injection molding process. Details of manufacturing the outer plastic peripheral portion 310 via the dual-molded injection molding process may be referred to the descriptions related to FIG. 2B, which will not be repeated herein.

In the 2nd embodiment, the inner sheet portion 320 may include a black material containing carbon. Besides, the inner sheet portion 320 may be integrally formed with the outer plastic peripheral portion 310 via an insert molding process.

Figure 3B:
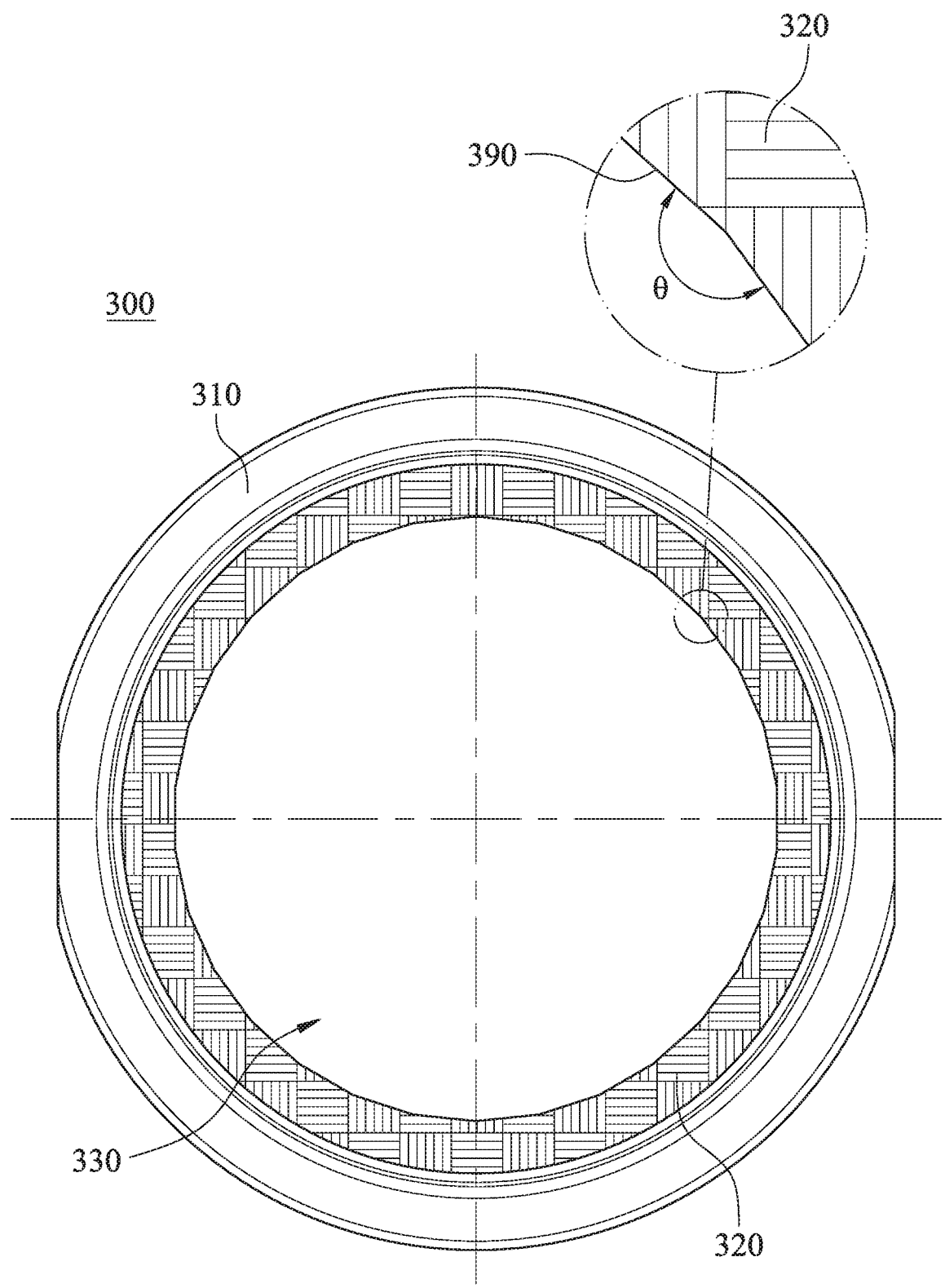
FIG. 3B is a front view of the dual-molded circular optical element of FIG. 3A.

FIG. 3B is a front view of the dual-molded circular optical element 300 of FIG. 3A. In FIG. 3B, the shape of the minimal central opening 330 may be non-circular. More specifically, the shape of the minimal central opening 330 can be triacontagon, and an angle θ between two adjacent sides 390 may be, for example, 168 degrees, but the present disclosure is not limited thereto.

The following Table 2 lists the data of the dual-molded circular optical element 300 defined according to the aforementioned parameters of the 2nd embodiment of the present disclosure as shown in FIG. 3A.

TABLE 2

| 2nd embodiment | | | |
|---|---|---|---|
| d | 0.023 mm | φi | 3.4 mm |
| φ | 4.85 mm | t | 0.663 mm |
| t1 | 0.445 mm | t2 | 0.195 mm |
| GU1 | 0.6% | GU2 | 8.0% |
| (t × t)/(φi × d) | 5.621 | | |

3rd Embodiment

Figure 4:
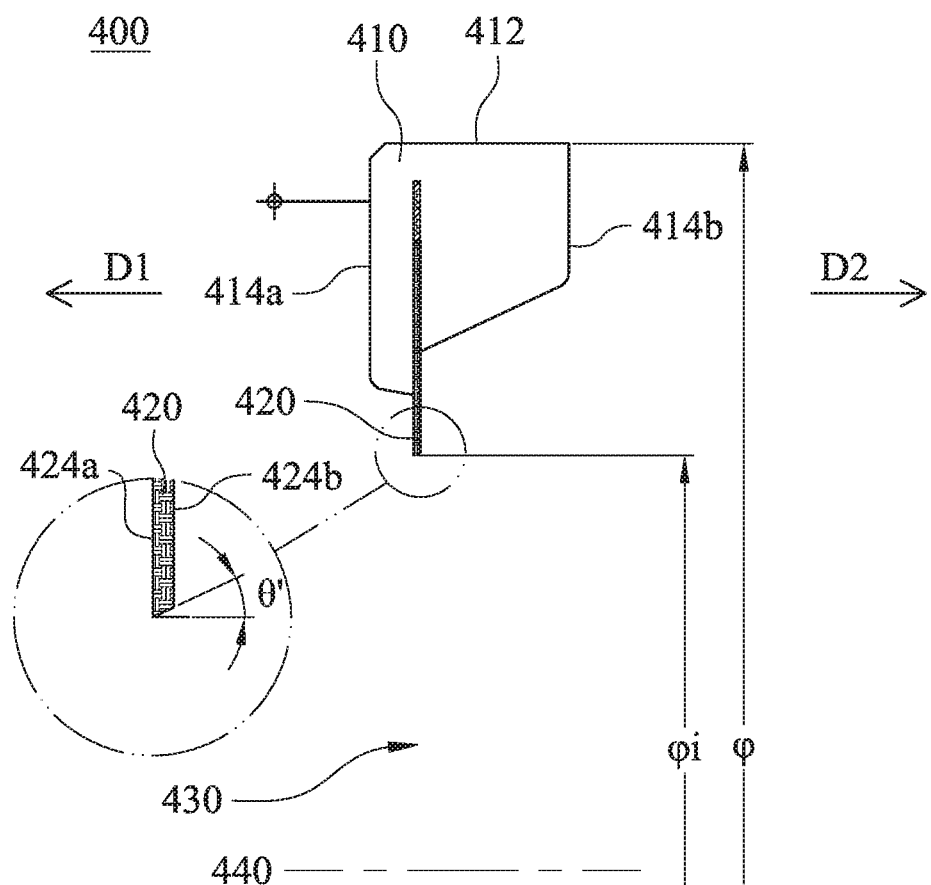
FIG. 4 is a side cross-sectional view of a dual-molded circular optical element of the 3rd embodiment of the present disclosure.

FIG. 4 is a side cross-sectional view of a dual-molded circular optical element 400 of the 3rd embodiment of the present disclosure. In FIG. 4, the dual-molded circular optical element 400 includes an outer plastic peripheral portion 410 and an inner sheet portion 420. The outer plastic peripheral portion 410 is located at an outer annular surface 412 of the dual-molded circular optical element 400. The inner sheet portion 420 is enclosed in the outer plastic peripheral portion 410, and the inner sheet portion 420 forms a minimal central opening 430 of the dual-molded circular optical element 400. Two sides of the outer plastic peripheral portion 410 are respectively disposed with flat planes 414a and 414b, and each of the flat planes 414a and 414b is perpendicular to a central axis 440 of the dual-molded circular optical element 400.

When distances between a central cross-sectional plane 422 of the inner sheet portion 420 and the flat planes 414a and 414b of the two sides are t1 and t2, the following condition is satisfied: 0.2<t1/t2<5.0. Preferably, the following condition can be satisfied: 0.25<t1/t2<4.0.

In FIG. 4, when a height of the dual-molded circular optical element 400 parallel to the central axis 440 is t, a diameter of the minimal central opening 430 is pi, and a thickness of the inner sheet portion 420 is d, the following condition can be satisfied: 0.5<(t×t)/(φi×d)<45.0. Preferably, the following condition can be satisfied: 2.0<(t×t)/(φi×d)<17.0.

Furthermore, when a maximum outer diameter of the outer annular surface 412 is φ, and a diameter of the minimal central opening 430 is pi, the following condition can be satisfied: 0.4<φi/φ<0.8. In addition, when a thickness of the inner sheet portion 420 is d, the distance between the central cross-sectional plane 422 of the inner sheet portion 420 and the flat plane 414a of one of the two sides is t1, the following condition can be satisfied: 0.2<(π²×d)/t1<3.0.

In FIG. 4, the outer plastic peripheral portion 410 includes an object-end surface (e.g., the flat plane 414a) facing an object-end direction D1 and an image-end surface (e.g., the flat plane 414b) facing an image-end direction D2. Moreover, the inner sheet portion 420 includes an object-end surface 424a facing the object-end direction D1 and an image-end surface 424b facing the image-end direction D2. The object-end surface 424a of the inner sheet portion 420 has a first gloss GU1 and the image-end surface 424b of the inner sheet portion 420 has a second gloss GU2, wherein the first gloss GU1 is different from the second gloss GU2. Preferably, the following conditions can be satisfied: 0%<GU1<1.8%; and 2.0%<GU2<9.0%.

In the 3rd embodiment, the outer plastic peripheral portion 410 is a black plastic made by a dual-molded injection molding process. Details of manufacturing the outer plastic peripheral portion 410 via the dual-molded to injection molding process may be referred to the descriptions related to FIG. 2B, which will not be repeated herein.

In the 3rd embodiment, the inner sheet portion 420 may include a black material containing carbon. Besides, the inner sheet portion 420 may be integrally formed with the outer plastic peripheral portion 410 via an insert molding process.

In FIG. 4, the thickness of the inner sheet portion 420 may gradually decrease from the image-end surface 424b to the object-end surface 424a. Specifically, an angle θ' of a inclined surface 424c (which is between the object-end surface 424a and the image-end surface 424b) relative to the central axis 440 is, for example, 25 degrees, but the present disclosure is not limited thereto.

The following Table 3 lists the data of the dual-molded circular optical element 400 defined according to the aforementioned parameters of the 3rd embodiment of the present disclosure as shown in FIG. 4.

TABLE 3

| 3rd embodiment | | | |
|---|---|---|---|
| d | 0.023 mm | φi | 2.77 mm |
| φ | 4.85 mm | t | 0.663 mm |
| t1 | 0.157 mm | t2 | 0.506 mm |
| GU1 | 7.6% | GU2 | 0.9% |
| (t × t)/(φi × d) | 6.899 | | |

4th Embodiment

Figure 5:
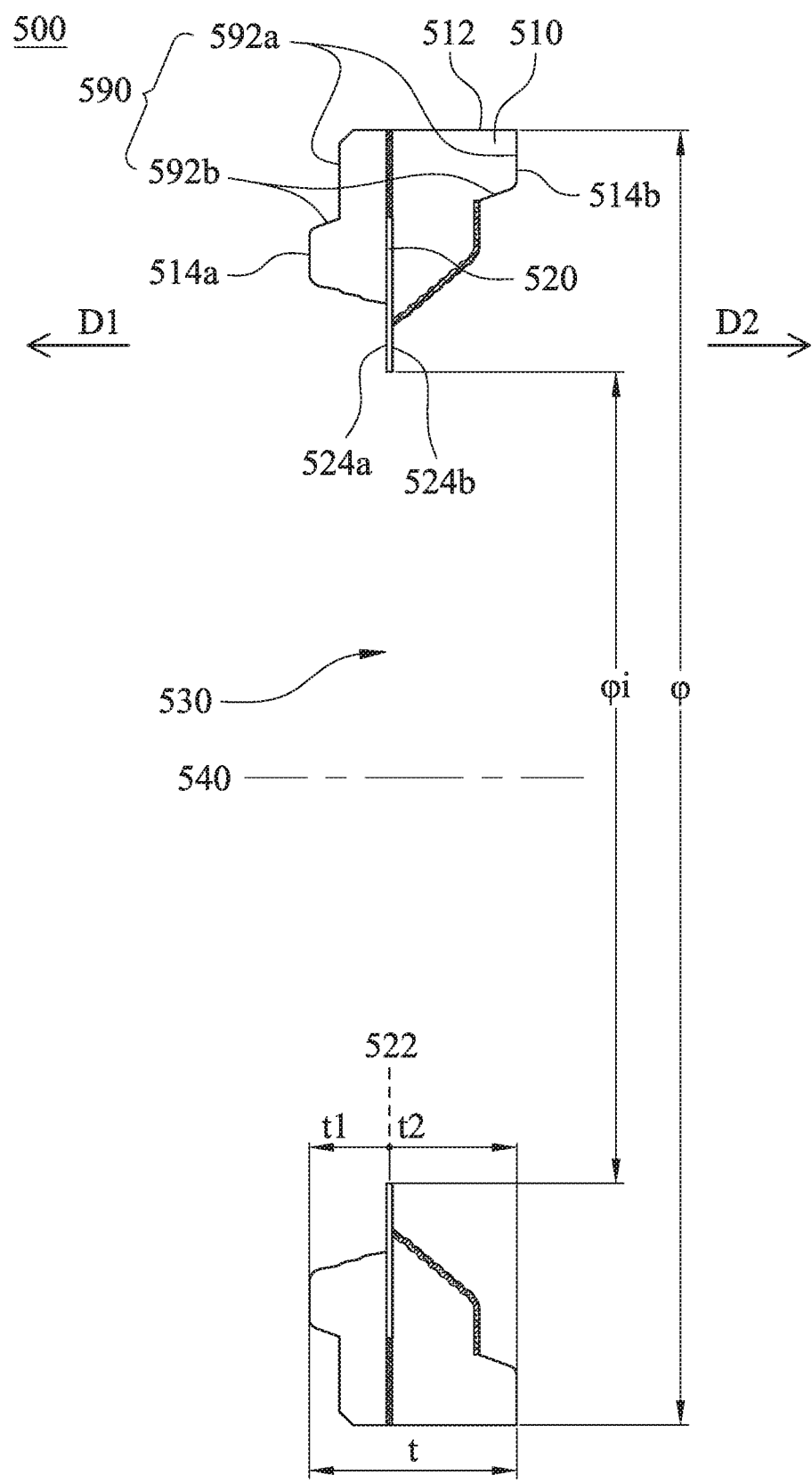
FIG. 5 is a side cross-sectional view of a dual-molded circular optical element of the 4th embodiment of the present disclosure.

FIG. 5 is a side cross-sectional view of a dual-molded circular optical element 500 of the 4th embodiment of the present disclosure. In FIG. 5, the dual-molded circular optical element 500 includes an outer plastic peripheral portion 510 and an inner sheet portion 520. The outer plastic peripheral portion 510 is located at an outer annular surface 512 of the dual-molded circular optical element 500. The inner sheet portion 520 is enclosed in the outer plastic peripheral portion 510, and the inner sheet portion 520 forms a minimal central opening 530 of the dual-molded circular optical element 500. Two sides of the outer plastic peripheral portion 510 are respectively disposed with flat planes 514a and 514b, and each of the flat planes 514a and 514b is perpendicular to a central axis 540 of the dual-molded circular optical element 500.

When distances between a central cross-sectional plane 522 of the inner sheet portion 520 and the flat planes 514a and 514b of the two sides are t1 and t2, the following condition is satisfied: 0.2<t1/t2<5.0. Preferably, the following condition can be satisfied: 0.25<t1/t2<4.0.

In FIG. 5, when a height of the dual-molded circular optical element 500 parallel to the central axis 540 is t, a diameter of the minimal central opening 530 is φi, and a thickness of the inner sheet portion 520 is d, the following condition can be satisfied: $0.5<(t\times t)/(\varphi i\times d)<45.0$. Preferably, the following condition can be satisfied: $2.0<(t\times t)(\varphi i\times d)<17.0$.

Furthermore, when a maximum outer diameter of the outer annular surface 512 is φ, and a diameter of the minimal central opening 530 is φi, the following condition can be satisfied: $0.4<\varphi i/\varphi<0.8$. In addition, when a thickness of the inner sheet portion 520 is d, the distance between the central cross-sectional plane 522 of the inner sheet portion 520 and the flat plane 514a of one of the two sides is t1, the following condition can be satisfied: $0.2<(\pi^2\times d)/t1<3.0$.

In FIG. 5, the outer plastic peripheral portion 510 includes an object-end surface (e.g., the flat plane 514a) facing an object-end direction D1 and an image-end surface (e.g., the flat plane 514b) facing an image-end direction D2. Moreover, the inner sheet portion 520 includes an object-end surface 524a facing the object-end direction D1 and an image-end surface 524b facing the image-end direction D2. The object-end surface 524a of the inner sheet portion 520 has a first gloss GU1 and the image-end surface 524b of the inner sheet portion 520 has a second gloss GU2, wherein the first gloss GU1 is different from the second gloss GU2. Preferably, the following conditions can be satisfied: $0\%<GU1<1.8\%$ and $2.0\%<GU2<9.0\%$.

In the 4th embodiment, the outer plastic peripheral portion 510 is a black plastic made by a dual-molded injection molding process. Details of manufacturing the outer plastic peripheral portion 510 via the dual-molded injection molding process may be referred to the descriptions related to FIG. 2B, which will not be repeated herein.

In the 4th embodiment, the inner sheet portion 520 may include a black material containing carbon. Besides, the inner sheet portion 520 may be integrally formed with the outer plastic peripheral portion 510 via an insert molding process.

In FIG. 5, an axial connection structure 590 may be disposed on the outer plastic peripheral portion 510, wherein the axial connection structure 590 may include an abutting surface 592a and a conical surface 592b. Accordingly, the dual-molded circular optical element 500 may be aligned with the optical axis more easily when the dual-molded circular optical element 500 is disposed in the imaging lens assembly.

The following Table 4 lists the data of the dual-molded circular optical element 500 defined according to the aforementioned parameters of the 4th embodiment of the present disclosure as shown in FIG. 5.

TABLE 4

| 4th embodiment | | | |
|---|---|---|---|
| D | 0.023 mm | φi | 3.04 mm |
| Φ | 4.85 mm | t | 0.776 mm |
| t1 | 0.3 mm | t2 | 0.476 mm |
| GU1 | 0.8% | GU2 | 3.8% |
| (t × t)/(φi × d) | 6.286 | | |

5th Embodiment

Figure 6:
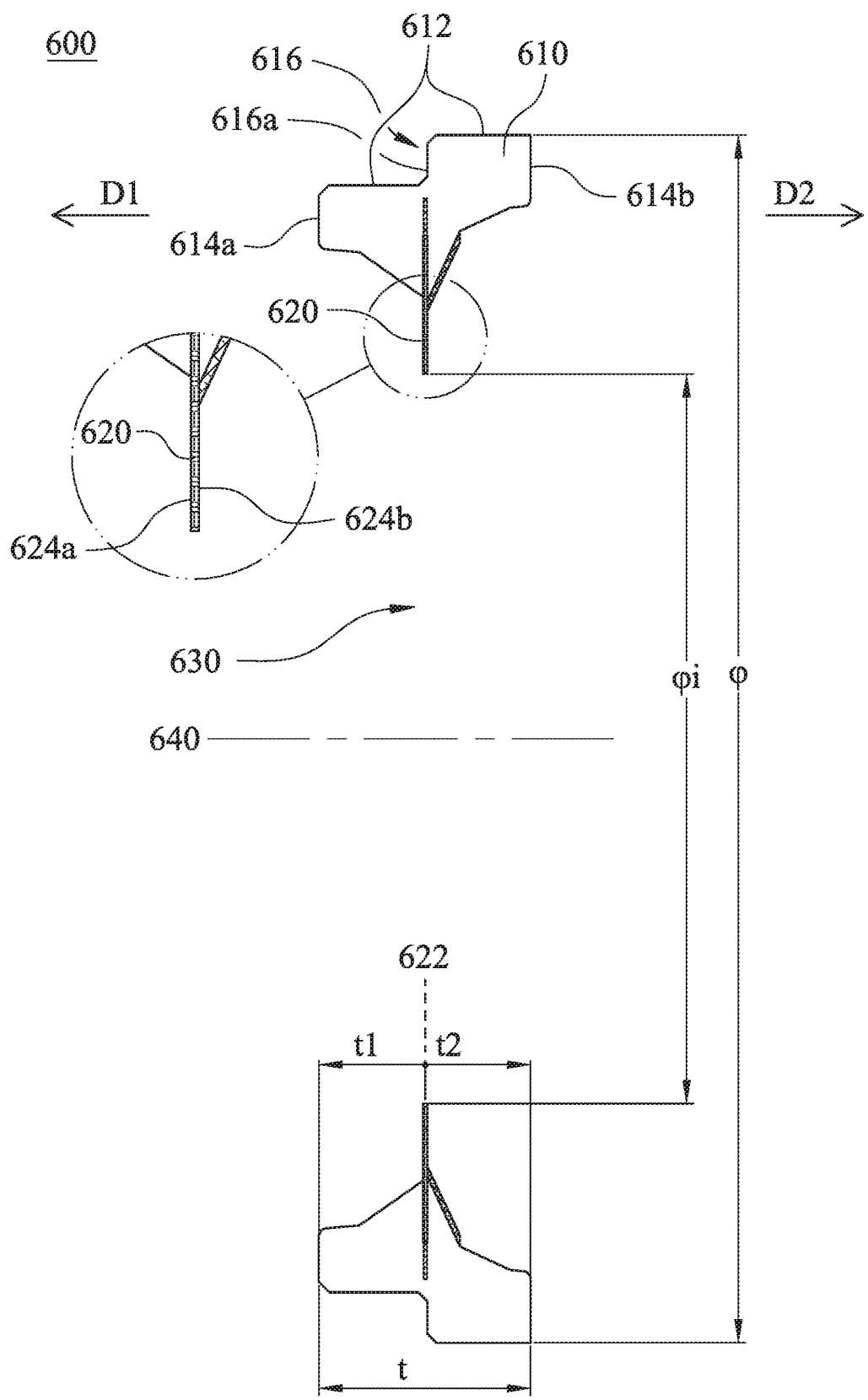
FIG. 6 is a side cross-sectional view of a dual-molded circular optical element of the 5th embodiment of the present disclosure.

FIG. 6 is a side cross-sectional view of a dual-molded circular optical element 600 of the 5th embodiment of the present disclosure. In FIG. 6, the dual-molded circular optical element 600 includes an outer plastic peripheral portion 610 and an inner sheet portion 620. The outer plastic peripheral portion 610 is located at an outer annular surface 612 of the dual-molded circular optical element 600. The inner sheet portion 620 is enclosed in the outer plastic peripheral portion 610, and the inner sheet portion 620 forms a minimal central opening 630 of the dual-molded circular optical element 600. Two sides of the outer plastic peripheral portion 610 are respectively disposed with flat planes 614a and 614b, and each of the flat planes 614a and 614b is perpendicular to a central axis 640 of the dual-molded circular optical element 600.

When distances between a central cross-sectional plane 622 of the inner sheet portion 620 and the flat planes 614a and 614b of the two sides are t1 and t2, the following condition is satisfied: $0.2<t1/t2<5.0$. Preferably, the following condition can be satisfied: $0.25<t1/t2<4.0$.

In FIG. 6, when a height of the dual-molded circular optical element 600 parallel to the central axis 640 is t, a diameter of the minimal central opening 630 is φi, and a thickness of the inner sheet portion 620 is d, the following condition can be satisfied: $0.5<(t\times t)/(\varphi i\times d)<45.0$. Preferably, the following condition can be satisfied: $2.0<(t\times t)/(\varphi i\times d)<17.0$.

Additionally, in FIG. 6, the outer plastic peripheral portion 610 may include a stair structure 616 disposed on the outer annular surface 612. The stair structure 616 may have a plane 616a that is perpendicular to the central axis 640. That is, the outer plastic peripheral portion 610 has at least two outer diameters, such that the appearance of the outer annular surface 612 may be configured with a height difference.

Furthermore, when a maximum outer diameter of the outer annular surface 612 is φ, and a diameter of the minimal central opening 630 is φi, the following condition can be satisfied: $0.4<\varphi i/\varphi<0.8$. In addition, when a thickness of the inner sheet portion 620 is d, the distance between the central cross-sectional plane 622 of the inner sheet portion 620 and the flat plane 614a of one of the two sides is t1, the following condition can be satisfied: $0.2<(\pi^2\times d)/t1<3.0$.

In FIG. 6, the outer plastic peripheral portion 610 includes an object-end surface (e.g., the flat plane 614a) facing an object-end direction D1 and an image-end surface (e.g., the flat plane 614b) facing an image-end direction D2. Moreover, the inner sheet portion 620 includes an object-end surface 624a facing the object-end direction D1 and an image-end surface 624b facing the image-end direction D2. The object-end surface 624a of the inner sheet portion 620 has a first gloss GU1 and the image-end surface 624b of the inner sheet portion 620 has a second gloss GU2, wherein the first gloss GU1 is different from the second gloss GU2. Preferably, the following conditions can be satisfied: $0\%<GU1<1.8\%$; and $2.0\%<GU2<9.0\%$.

In the 5th embodiment, the outer plastic peripheral portion 610 is a black plastic made by a dual-molded injection molding process. Details of manufacturing the outer plastic peripheral portion 610 via the dual-molded injection molding process may be referred to the descriptions related to FIG. 2B, which will not be repeated herein.

In the 5th embodiment, the inner sheet portion 620 may include a black material containing carbon. Besides, the inner sheet portion 620 may be integrally formed with the outer plastic peripheral portion 610 via an insert molding process.

The following Table 5 lists the data of the dual-molded circular optical element 600 defined according to the aforementioned parameters of the 5th embodiment of the present disclosure as shown in FIG. 6.

TABLE 5

| 5th embodiment | | | |
|---|---|---|---|
| d | 0.016 mm | φi | 2.9 mm |
| φ | 4.8 mm | t | 0.84 mm |
| t1 | 0.422 mm | t2 | 0.418 mm |
| GU1 | 0.9% | GU2 | 6.8% |
| (t × t)/(φi × d) | 15.207 | | |

6th Embodiment

Figure 7A:
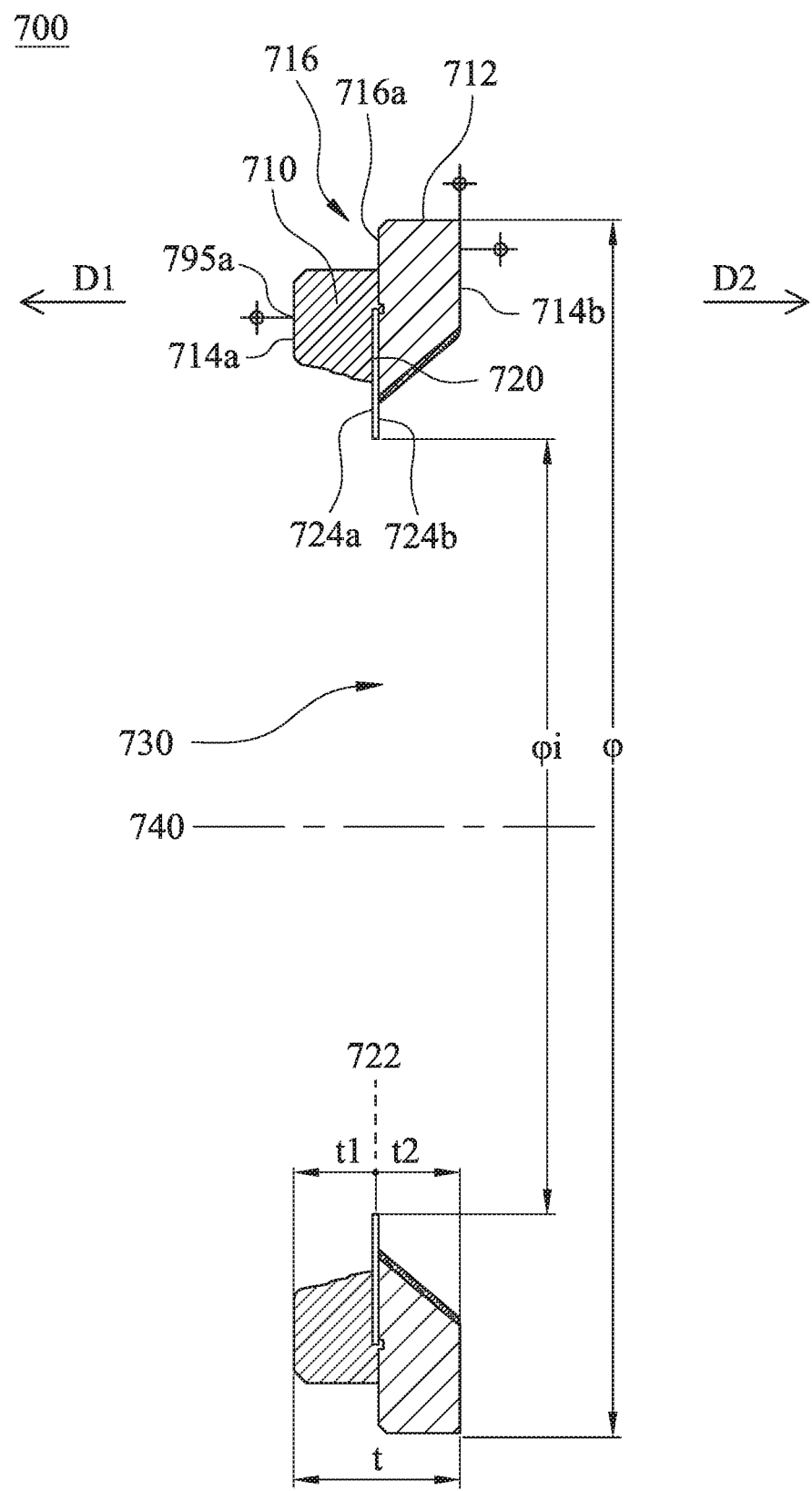
FIG. 7A is a side cross-sectional view of a dual-molded circular optical element of the 6th embodiment of the present disclosure.

FIG. 7A is a side cross-sectional view of a dual-molded circular optical element 700 of the 6th embodiment of the present disclosure. In FIG. 7A, the dual-molded circular optical element 700 includes an outer plastic peripheral portion 710 and an inner sheet portion 720. The outer plastic peripheral portion 710 is located at an outer annular surface 712 of the dual-molded to circular optical element 700. The inner sheet portion 720 is enclosed in the outer plastic peripheral portion 710, and the inner sheet portion 720 forms a minimal central opening 730 of the dual-molded circular optical element 700. Two sides of the outer plastic peripheral portion 710 are respectively disposed with flat planes 714a and 714b, and each of the flat planes 714a and 714b is perpendicular to a central axis 740 of the dual-molded circular optical element 700.

When distances between a central cross-sectional plane 722 of the inner sheet portion 720 and the flat planes 714a and 714b of the two sides are t1 and t2, the following condition is satisfied: 0.2<t1/t2<5.0. Preferably, the following condition can be satisfied: 0.25<t1/t2<4.0.

In FIG. 7A, when a height of the dual-molded circular optical element 700 parallel to the central axis 740 is t, a diameter of the minimal central opening 730 is φi, and a thickness of the inner sheet portion 720 is d, the following condition can be satisfied: 0.5<(t×t)(φi×d)<45.0. Preferably, the following condition can be satisfied: 2.0<(t×t)/(φi×d)<17.0.

Additionally, in FIG. 7A, the outer plastic peripheral portion 710 may include a stair structure 716 disposed on the outer annular surface 712. The stair structure 716 may have a plane 716a that is perpendicular to the central axis 740. That is, the outer plastic peripheral portion 710 has at least two outer diameters, such that the appearance of the outer annular surface 712 may be configured with a height difference.

Furthermore, when a maximum outer diameter of the outer annular surface 712 is φ, and a diameter of the minimal central opening 730 is φi, the following condition can be satisfied: 0.4<φi/φ<0.8. In addition, when a thickness of the inner sheet portion 720 is d, and the distance between the central cross-sectional plane 722 of the inner sheet portion 720 and the flat plane 714a of one of the two sides is t1, the following condition can be satisfied: 0.2<(π²×d)/t1<3.0.

In FIG. 7A, the outer plastic peripheral portion 710 includes an object-end surface (e.g., the flat plane 714a) facing an object-end direction D1 and an image-end surface (e.g., the flat plane 714b) facing an image-end direction D2. Moreover, the inner sheet portion 720 includes an object-end surface 724a facing the object-end direction D1 and an image-end surface 724b facing the image-end direction D2. The object-end surface 724a of the inner sheet portion 720 has a first gloss GU1 and the image-end surface 724b of the inner sheet portion 720 has a second gloss GU2, wherein the first gloss GU1 is different from the second gloss GU2.

Preferably, the following conditions can be satisfied: 0%<GU1<1.8%; and 2.0%<GU2<9.0%.

In the 6th embodiment, the outer plastic peripheral portion 710 is a black plastic made by a dual-molded injection molding process. Details of manufacturing the outer plastic peripheral portion 710 via the dual-molded injection molding process may be referred to the following descriptions related to FIG. 7B.

Figure 7B:
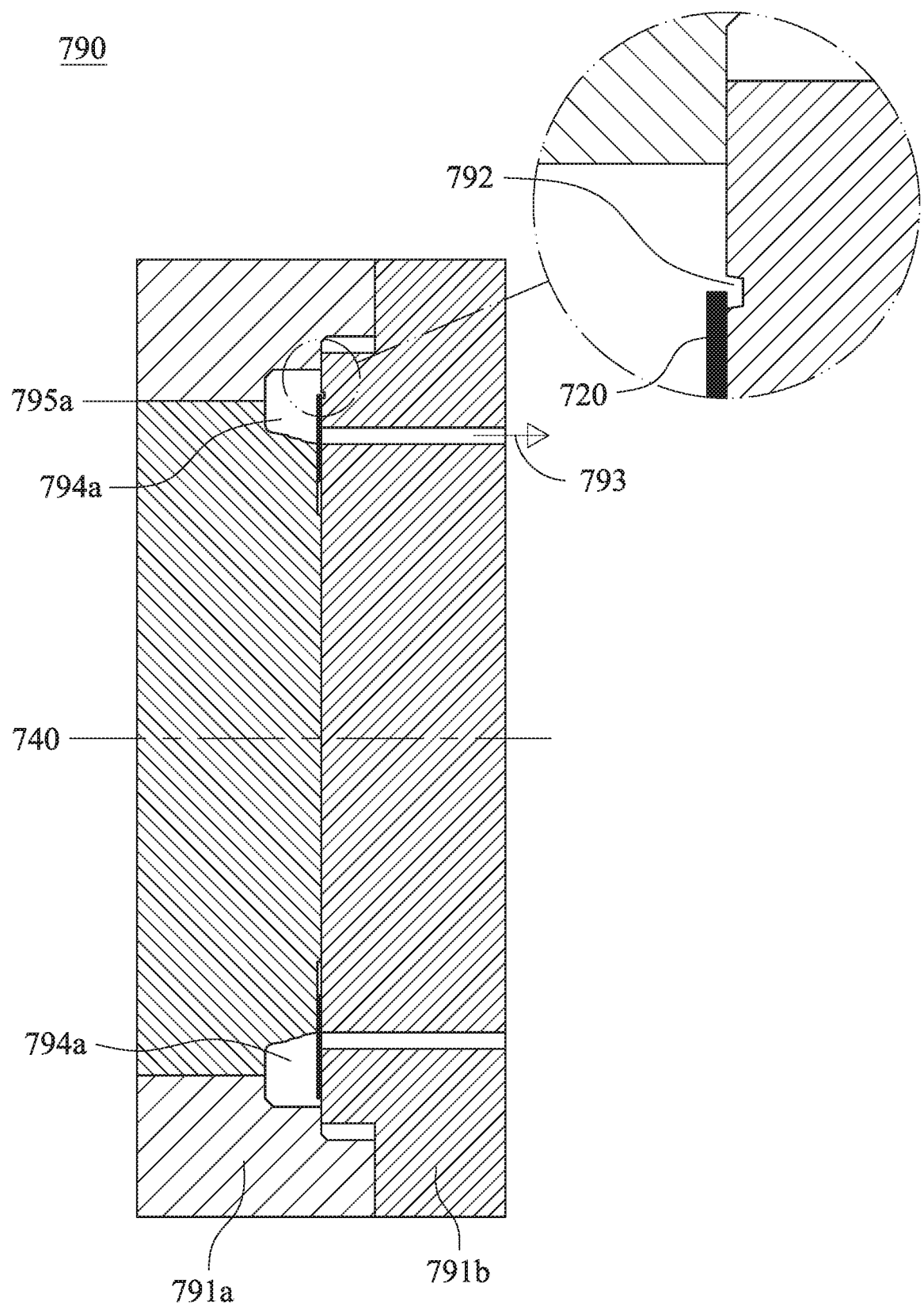
FIG. 7B is a cross-sectional view of a mold used in the dual-molded injection molding process of the dual-molded circular optical element of FIG. 7A.

FIG. 7B is a cross-sectional view of a mold 790 used in the dual-molded injection molding process of the dual-molded circular optical element 700 of FIG. 7A. The dual-molded injection process includes a first injection molding process and a second injection molding process. In FIG. 7B, in the first injection molding process, the mold 790 may be used to form a part of the outer plastic peripheral portion 710. Specifically, the mold 790 may include a movable side 791a and a fixed side 791b. The movable side 791a and the fixed side 791b may cooperatively clamp the inner sheet portion 720, and the inner sheet portion 720 may be fixated by the suction from a suction channel 793. Next, the injection molding machine may inject the plastic into a chamber 794a, such that the plastic may be hardened to be the part of the outer plastic peripheral portion 710.

In FIG. 7B, a machining feature 792 may be additionally disposed on the fixed side 791b, such that the plastic used in the first injection molding process may better fixate the inner sheet portion 720.

Besides, the dual-molded circular optical element 700 may further include a perpendicular parting surface 795a disposed at the object-end surface (e.g., the flat plane 714a) of the outer plastic peripheral portion 710, and the perpendicular parting surface 795a is closer to the central axis 740 than the outer annular surface 712 is thereto.

Figure 7C:
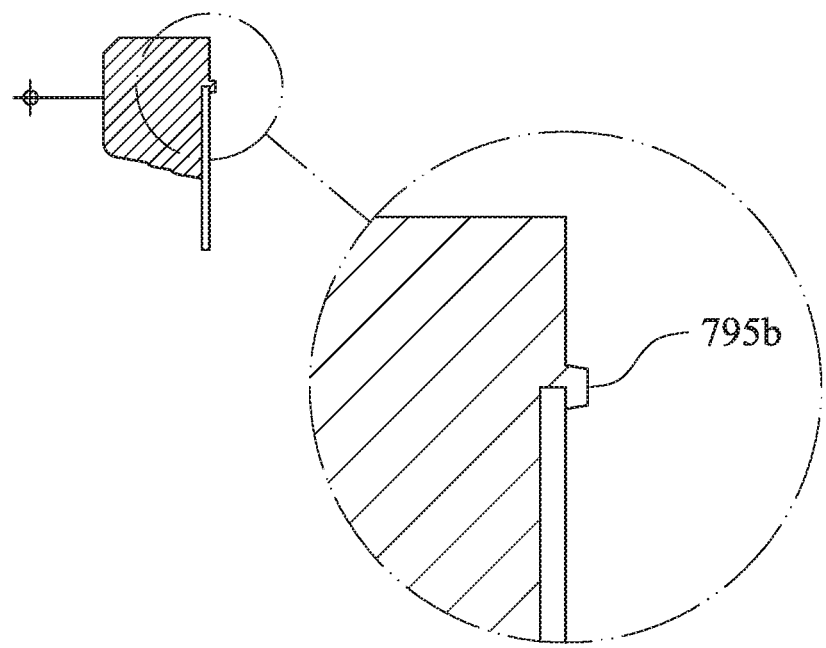
FIG. 7C is a schematic view of a semi-finished product made by the first injection molding process according to FIG. 7B.
Figure 7C:
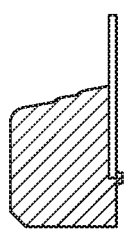

FIG. 7C is a schematic view of a semi-finished product 795 made by the first injection molding process according to FIG. 7B. In FIG. 7C, the semi-finished product 795 may be the plastic hardened in the chamber 794a, i.e., the part of the outer plastic peripheral portion 710. Moreover, the appearance of the semi-finished product 795 will be disposed with a protrusion structure 795b corresponding to the machining feature 792 on the fixed side 791b. The descriptions related to the second injection molding process may be referred to the descriptions of FIG. 2B, which will not be repeated herein.

In the 6th embodiment, the inner sheet portion 720 may include a black material containing carbon. Besides, the inner sheet portion 720 may be integrally formed with the outer plastic peripheral portion 710 via an insert molding process.

The following Table 6 lists the data of the dual-molded circular optical element 700 defined according to the aforementioned parameters of the 6th embodiment of the present disclosure as shown in FIG. 7A.

TABLE 6

| 6th embodiment | | | |
|---|---|---|---|
| d | 0.023 mm | φi | 3.1 mm |
| φ | 4.85 mm | t | 0.663 mm |
| t1 | 0.327 mm | t2 | 0.336 mm |
| GU1 | 5.4% | GU2 | 1.2% |
| (t × t)/(φi × d) | 6.165 | | |

Figure 8:
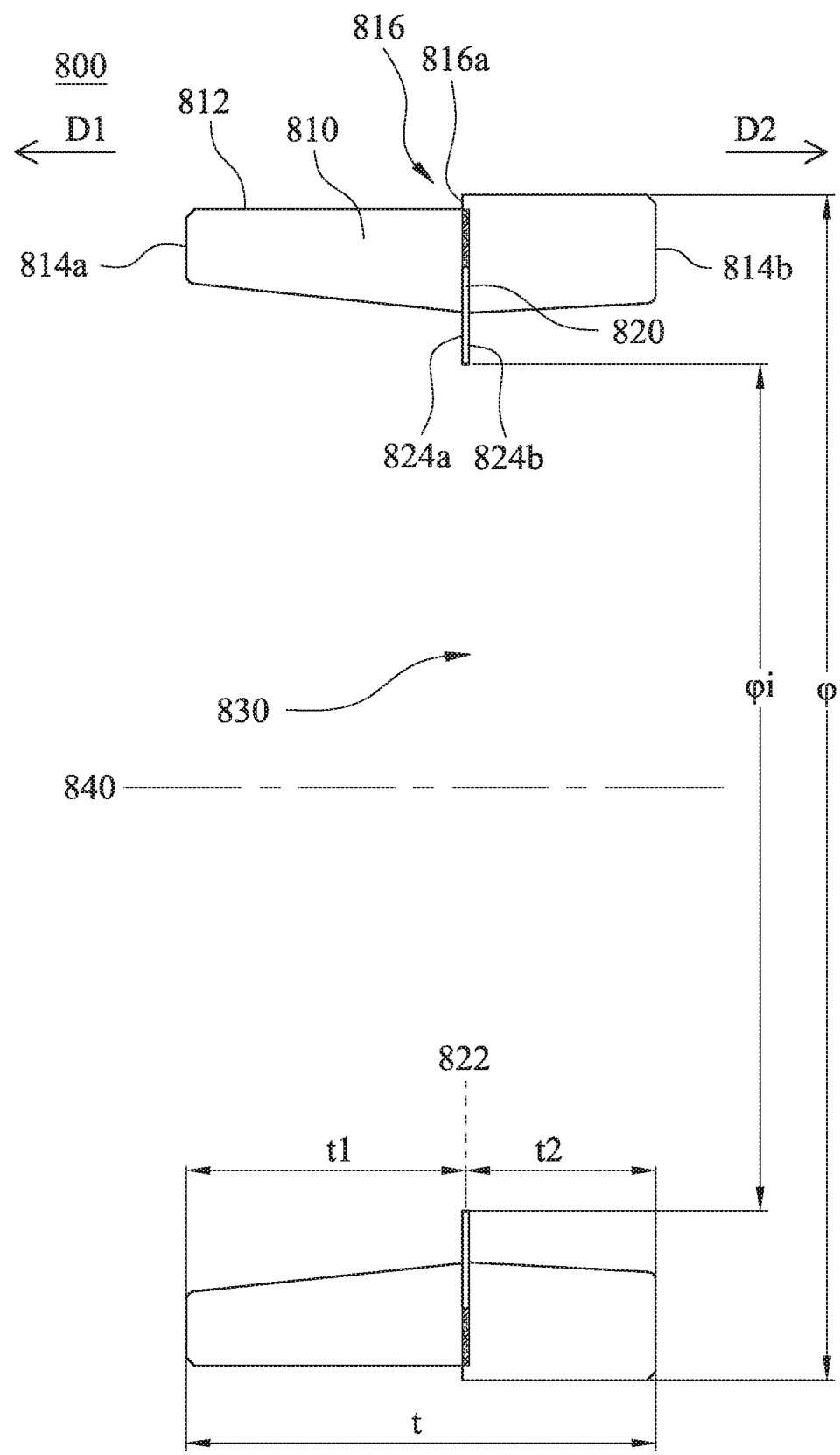
FIG. 8 is a side cross-sectional view of a dual-molded circular optical element of the 7th embodiment of the present disclosure.

FIG. 8 is a side cross-sectional view of a dual-molded circular optical element 800 of the 7th embodiment of the present disclosure. In FIG. 8, the dual-molded circular optical element 800 includes an outer plastic peripheral portion 810 and an inner sheet portion 820. The outer plastic peripheral portion 810 is located at an outer annular surface 812 of the dual-molded circular optical element 800. The inner sheet portion 820 is enclosed in the outer plastic peripheral portion 810, and the inner sheet portion 820 forms a minimal central opening 830 of the dual-molded circular optical element 800. Two sides of the outer plastic peripheral portion 810 are respectively disposed with flat planes 814a and 814b, and each of the flat planes 814a and 814b is perpendicular to a central axis 840 of the dual-molded circular optical element 800.

When distances between a central cross-sectional plane 822 of the inner sheet portion 820 and the flat planes 814a and 814b of the two sides are t1 and t2, the following condition is satisfied: 0.2<t1/t2<5.0. Preferably, the following condition can be satisfied: 0.25<t1/t2<4.0.

In FIG. 8, when a height of the dual-molded circular optical element 800 parallel to the central axis 840 is t, a diameter of the minimal central opening 830 is φi, and a thickness of the inner sheet portion 820 is d, the following condition can be satisfied: 0.5<(t×t)/(φi×d)<45.0. Preferably, the following condition can be satisfied: 2.0<(t×t)(φi×d)<17.0.

Additionally, in FIG. 8, the outer plastic peripheral portion 810 may include a stair structure 816 disposed on the outer annular surface 812. The stair structure 816 may have a plane 816a that is perpendicular to the central axis 840. That is, the outer plastic peripheral portion 810 has at least two outer diameters, such that the appearance of the outer annular surface 812 may be configured with a height difference.

Furthermore, when a maximum outer diameter of the outer annular surface 812 is φ, and a diameter of the minimal central opening 830 is φi, the following condition can be satisfied: 0.4<φi/φ<0.8. In addition, when a thickness of the inner sheet portion 820 is d, the distance between the central cross-sectional plane 822 of the inner sheet portion 820 and the flat plane 814a of one of the two sides is t1, the following condition can be satisfied: 0.2<($\pi^2$×d)/t1<3.0.

In FIG. 8, the outer plastic peripheral portion 810 includes an object-end surface (e.g., the flat plane 814a) facing an object-end direction D1 and an image-end surface (e.g., the flat plane 814b) facing an image-end direction D2. Moreover, the inner sheet portion 820 includes an object-end surface 824a facing the object-end direction D1 and an image-end surface 824b facing the image-end direction D2. The object-end surface 824a of the inner sheet portion 820 has a first gloss GU1 and the image-end surface 824b of the inner sheet portion 820 has a second gloss GU2, wherein the first gloss GU1 is different from the second gloss GU2. Preferably, the following conditions can be satisfied: 0%<GU1<1.8%; and 2.0%<GU2<9.0%.

In the 7th embodiment, the outer plastic peripheral portion 810 is a black plastic made by a dual-molded injection molding process. Details of manufacturing the outer plastic peripheral portion 810 via the dual-molded injection molding process may be referred to the descriptions related to FIG. 2B, which will not be repeated herein.

In the 7th embodiment, the inner sheet portion 820 may include a black material containing carbon. Besides, the inner sheet portion 820 may be integrally formed with the outer plastic peripheral portion 810 via an insert molding process.

The following Table 7 lists the data of the dual-molded circular optical element 800 defined according to the aforementioned parameters of the 7th embodiment of the present disclosure as shown in FIG. 8.

TABLE 7

| 7th embodiment | | | |
|---|---|---|---|
| d | 0.023 mm | φi | 2.928 mm |
| φ | 4.1 mm | t | 1.623 mm |
| t1 | 0.966 mm | t2 | 0.657 mm |
| GU1 | 0.6% | GU2 | 3.2% |
| (t × t)/(φi × d) | 39.114 | | |

8th Embodiment

Figure 9:
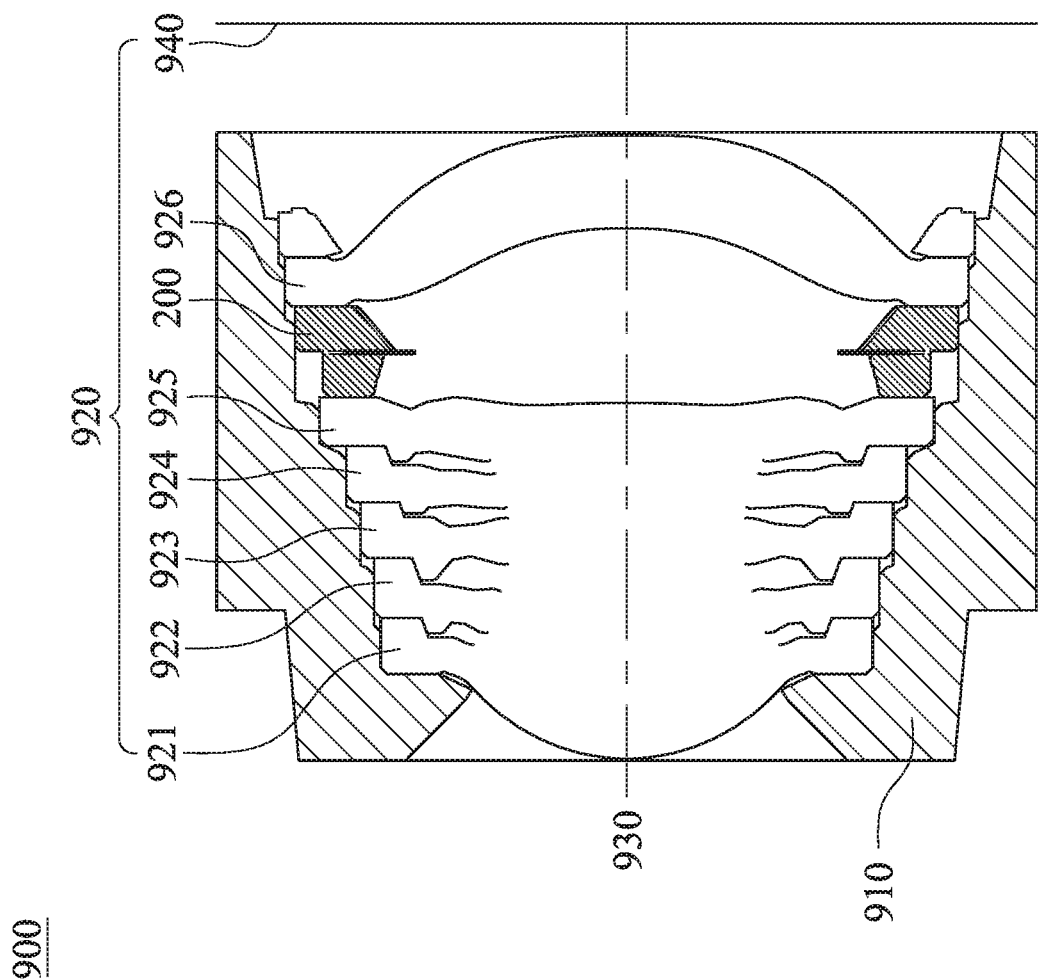
FIG. 9 is a side cross-sectional view of an imaging device according to the 8th embodiment of the present disclosure.

FIG. 9 is a side cross-sectional view of an imaging device 900 according to the 8th embodiment of the present disclosure. In FIG. 9, the imaging device 900 includes a plastic barrel 910 and an imaging lens assembly 920. The imaging lens assembly 920 is disposed in the plastic barrel 910, and the imaging lens assembly 920 includes, from the object-end to the image-end, lens elements 921, 922, 923, 924, 925, the dual-molded circular optical element 200, a lens element 926, and an image surface 940, wherein the dual-molded circular optical element 200 is the same as the 1st embodiment, and there are six lens elements in the imaging lens assembly 920 (i.e., the lens elements 921, 922, 923, 924, 925, and 926). The lens elements 921, 922, 923, 924, 925, the dual-molded circular optical element 200, and the lens element 926 are disposed inside the plastic barrel 910 along an optical axis 930 of the imaging lens assembly 920. In other embodiments (not shown), the imaging lens assembly 920 may include four, five, seven, or more lens elements.

In other embodiments, the dual-molded circular optical element 200 may be replaced with the dual-molded circular optical element 300, 400, and 700 of the 2nd, 3rd, and 6th embodiments. To each of the dual-molded circular optical element 200, 300, 400, and 700, since the distances between the inner sheet portion and the flat planes on two sides of the plastic peripheral portion are different, which can be implemented by adjusting the thickness of the plastic used in the second injection molding process, the inner sheet portion may provide various light blocking position along the optical axis 930. That is, the light blocking position of the inner sheet portion will not be limited to be near the lens elements, such that the stray lights may be reduced to improve imaging quality.

9th Embodiment

Figure 10:
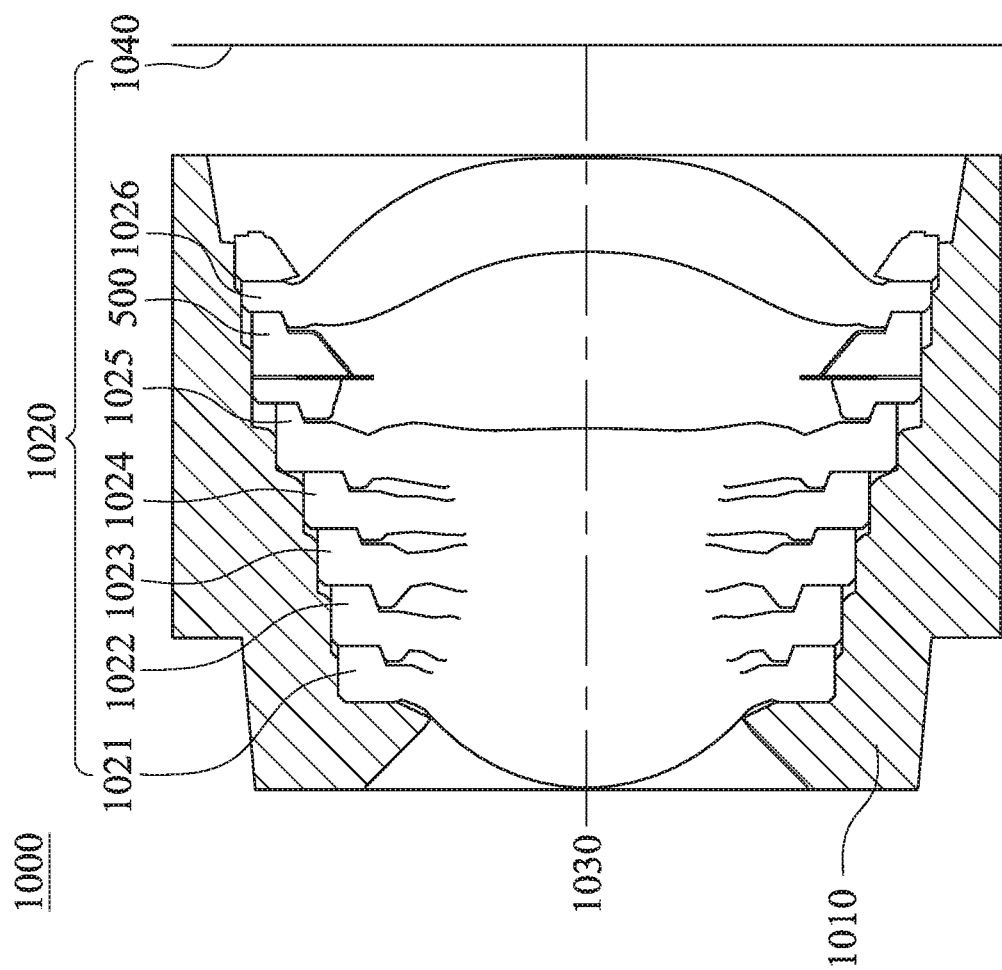
FIG. 10 is a side cross-sectional view of an imaging device according to the 9th embodiment of the present disclosure.

FIG. 10 is a side cross-sectional view of an imaging device 1000 according to the 9th embodiment of the present disclosure. In FIG. 10, the imaging device 1000 includes a plastic barrel 1010 and an imaging lens assembly 1020. The imaging lens assembly 1020 is disposed in the plastic barrel 1010, and the imaging lens assembly 1020 includes, from the object-end to the image-end, lens elements 1021, 1022, 1023, 1024, 1025, the dual-molded circular optical element 500, a lens element 1026, and an Image surface 1040, wherein the dual-molded circular optical element 500 is the same as the 4th embodiment, and there are six lens elements in the imaging lens assembly 1020 (i.e., the lens elements 1021, 1022, 1023, 1024, 1025, and 1026). The lens elements 1021, 1022, 1023, 1024, 1025, the dual-molded circular optical element 500, and the lens element 1026 are disposed inside the plastic barrel 1010 along an optical axis 1030 of the imaging lens assembly 1020. In other embodiments (not shown), the imaging lens assembly 1020 may include four, five, seven, or more lens elements.

In FIG. 10, since the dual-molded circular optical element 500 is disposed with an axial connection structure 590, the dual-molded circular optical element 500 may be aligned with the optical axis more easily when the dual-molded circular optical element 500 is disposed inside the imaging lens assembly 1020.

10th Embodiment

Figure 11:
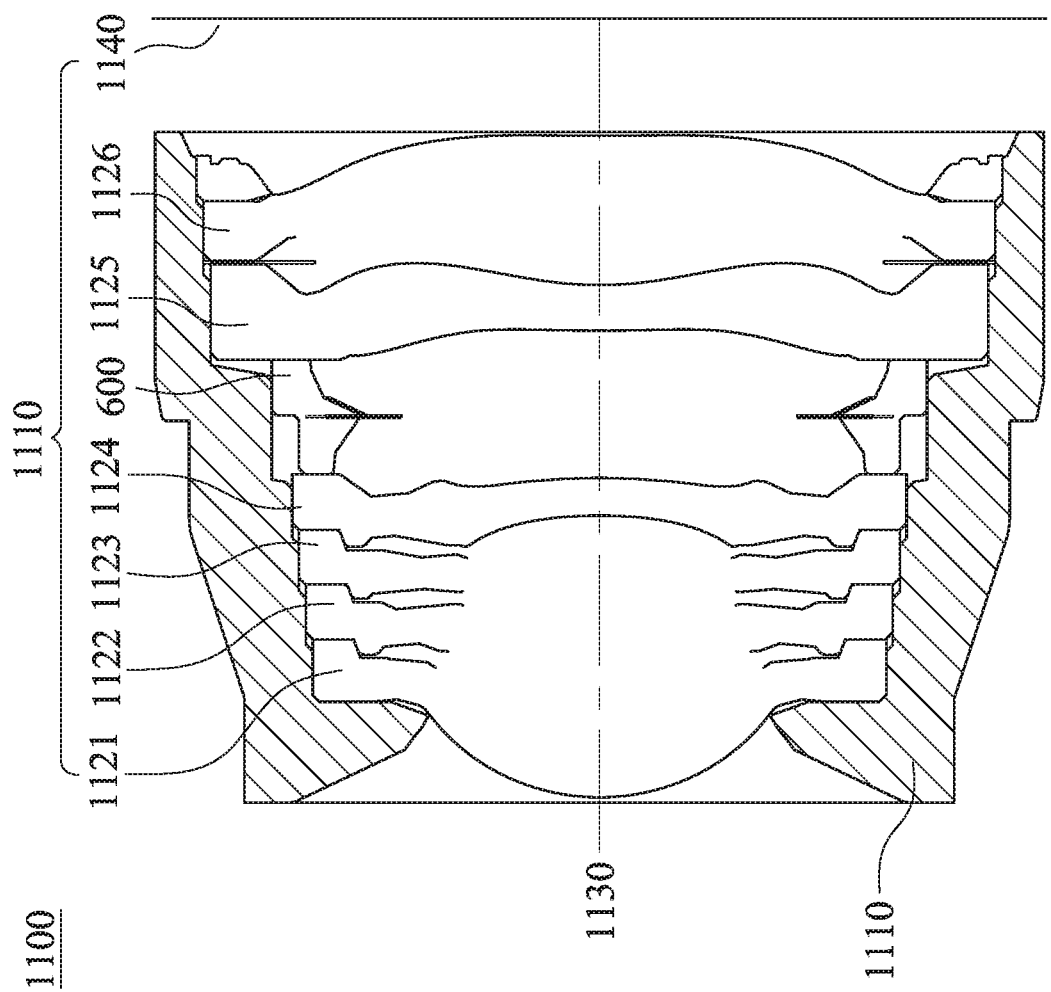
FIG. 11 is a side cross-sectional view of an imaging device according to the 10th embodiment of the present disclosure.

FIG. 11 is a side cross-sectional view of an imaging device 1100 according to the 10th embodiment of the present disclosure. In FIG. 11, the imaging device 1100 includes a plastic barrel 1110 and an imaging lens assembly 1120. The imaging lens assembly 1120 is disposed in the plastic barrel 1110, and the imaging lens assembly 1120 includes, from the object-end to the image-end, lens elements 1121, 1122, 1123, 1124, the dual-molded circular optical element 600, lens elements 1125, 1126, and an image surface 1140, wherein the dual-molded circular optical element 600 is the same as the 5th embodiment, and there are six lens elements in the imaging lens assembly 1120 (i.e., the lens elements 1121, 1122, 1123, 1124, 1125, and 1126). The lens elements 1121, 1122, 1123, 1124, the dual-molded circular optical element 600, and the lens elements 1125, and 1126 are disposed inside the plastic barrel 1110 along an optical axis 1130 of the imaging lens assembly 1120. In other embodiments (not shown), the imaging lens assembly 1120 may include four, five, seven, or more lens elements. Accordingly, the light blocking position of the inner sheet portion of the dual-molded circular optical element 600 will not be limited to be near the lens elements, which leads to a stacking way different from conventional optical elements.

11th Embodiment

Figure 12:
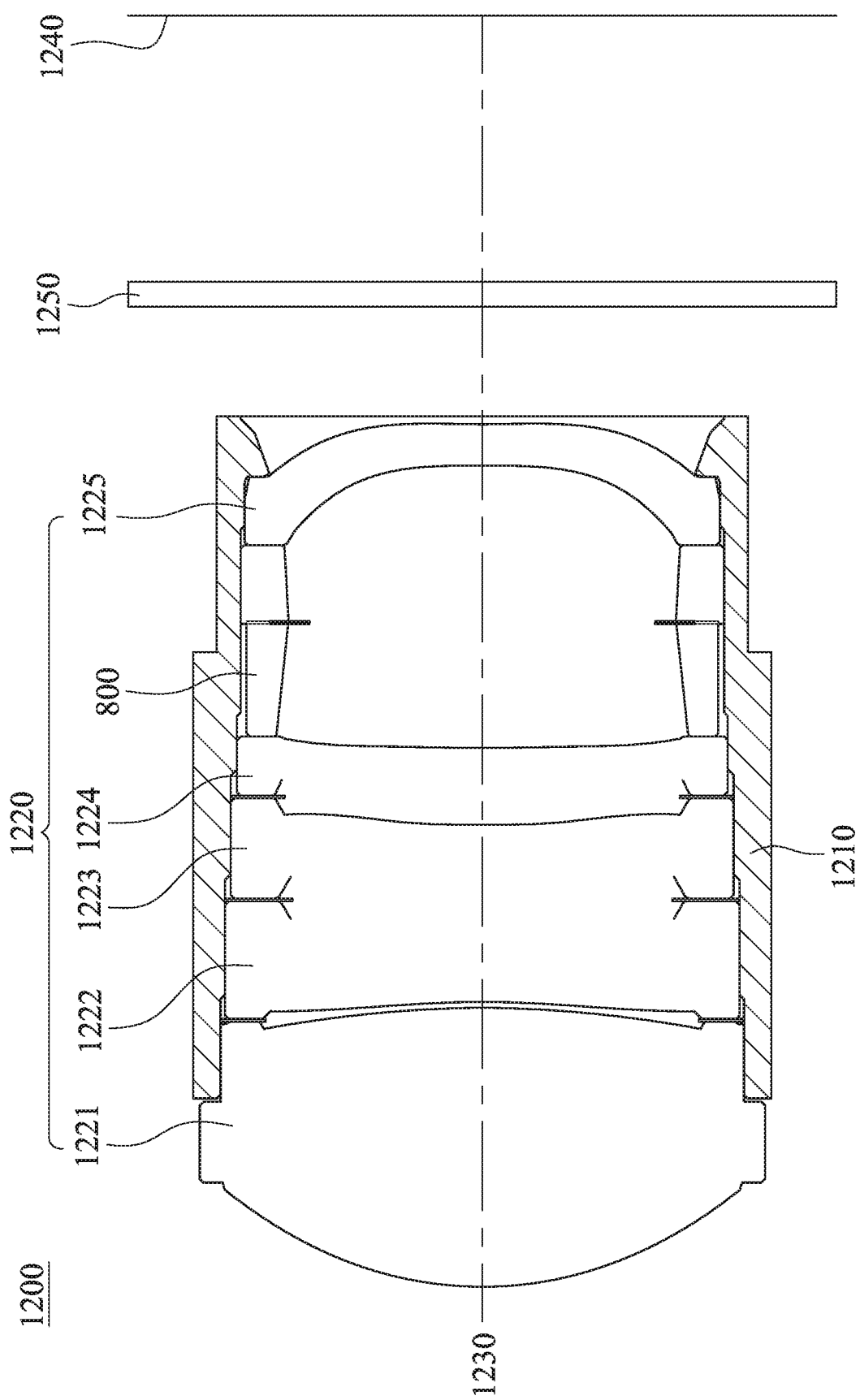
FIG. 12 is a side cross-sectional view of an imaging device according to the 11th embodiment of the present disclosure.

FIG. 12 is a side cross-sectional view of an imaging device 1200 according to the 11th embodiment of the present disclosure. In FIG. 12, the imaging device 1200 includes a plastic barrel 1210 and an imaging lens assembly 1220. The imaging lens assembly 1220 is disposed in the plastic barrel 1210, and the imaging lens assembly 1220 includes, from the object-end to the image-end, lens elements 1221, 1222, 1223, 1224, the dual-molded circular optical element 800, a lens element 1225, a glass panel 1250, and an image surface 1240, wherein the dual-molded circular optical element 800 is the same as the 7th embodiment, and there are five lens elements in the imaging lens assembly 1220 (i.e., the lens elements 1221, 1222, 1223, 1224, and 1225). The lens elements 1221, 1222, 1223, 1224, the dual-molded circular optical element 800, and the lens element 1225 are disposed inside the plastic barrel 1210 along an optical axis 1230 of the imaging lens assembly 1220. In other embodiments (not shown), the imaging lens assembly 1220 may include four, six, seven, or more lens elements. Accordingly, the light blocking position of the inner sheet portion of the dual-molded circular optical element 800 will not be limited to be near the lens elements, which leads to a stacking way different from conventional optical elements.

12th Embodiment

Figure 13A:
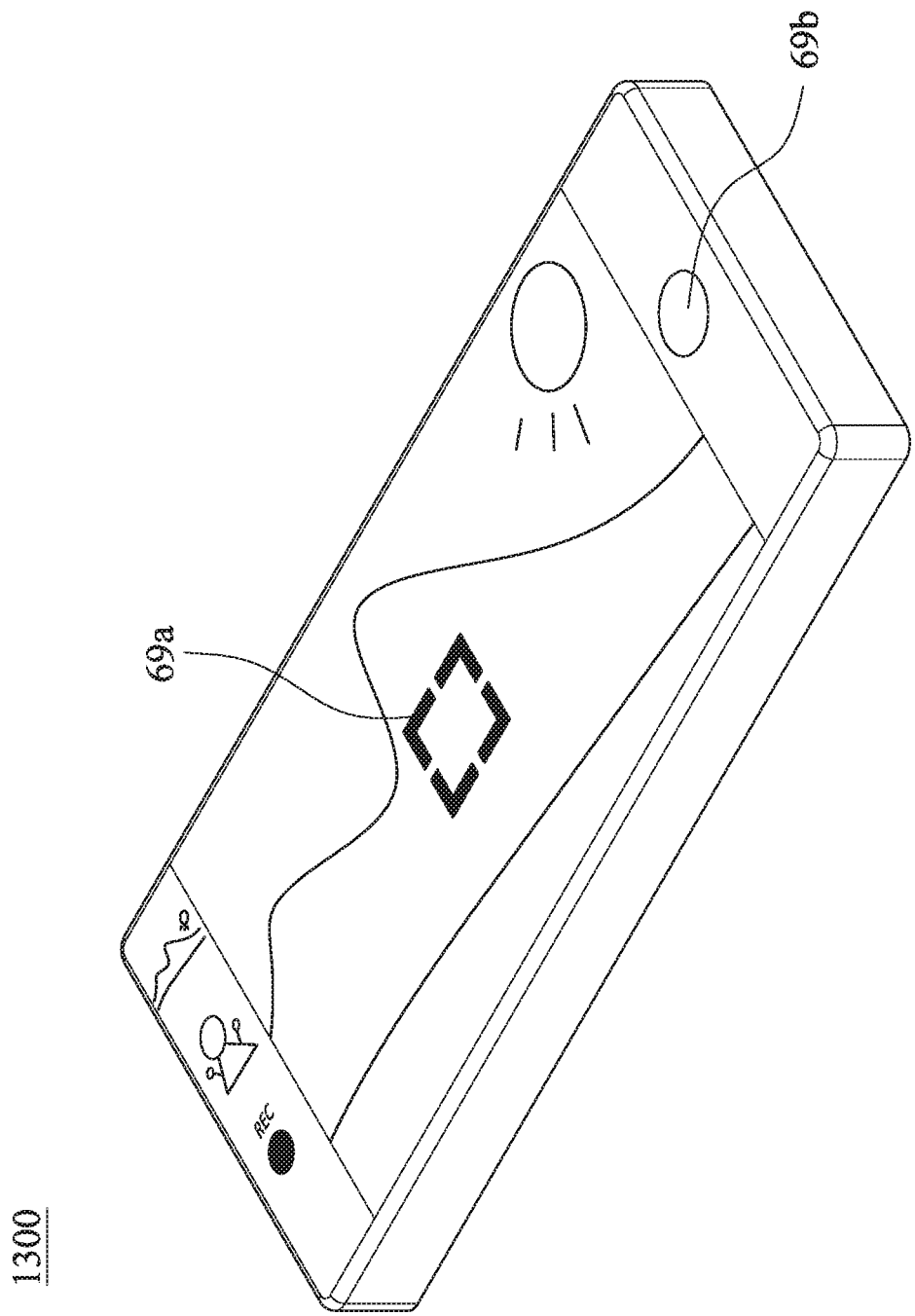
FIG. 13A is a schematic view of an electronic device of the 12th embodiment of the present disclosure.
Figure 13B:
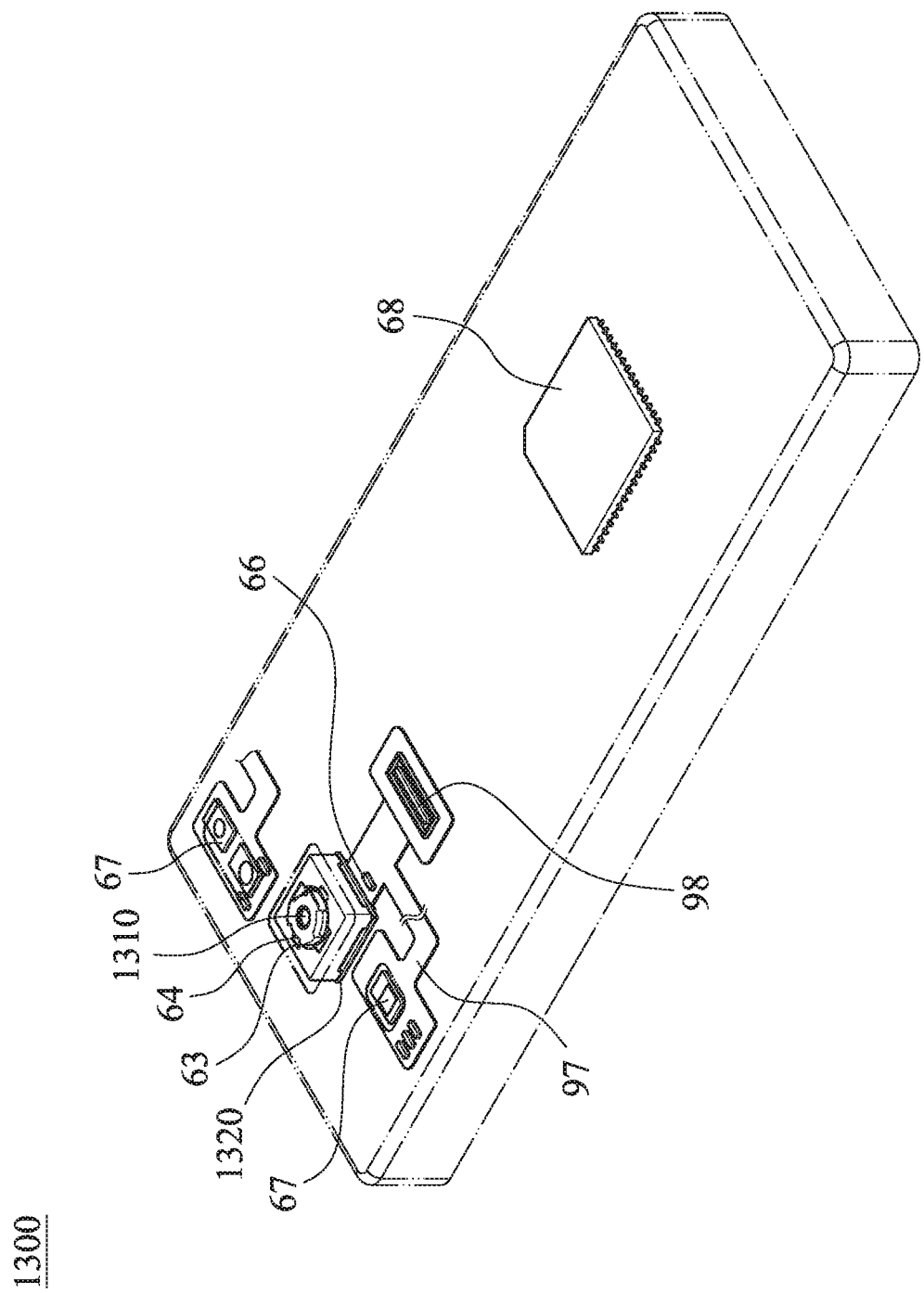
FIG. 13B is another schematic view of the electronic device of the 12th embodiment of the present disclosure.

FIG. 13A is a schematic view of an electronic device 1300 of the 12th embodiment of the present disclosure, FIG. 13B is another schematic view of the electronic device 1300 of the 12th embodiment of the present disclosure, and particularly, FIG. 13A and FIG. 13B are schematic views of a camera of the electronic device 1300. In FIG. 13A and FIG. 13B, the electronic device 1300 of the 12th embodiment is a smart phone which includes an imaging device 1310 and an image sensor 1320 of the present disclosure. The image sensor 1320 is disposed on an image surface (not shown) of the imaging device 1310. Accordingly, the high demands to the mass production and appearances of imaging lens module of the current electronic device market can be satisfied.

Specifically, the user activates the capturing mode via the user interface 69 of the electronic device 1300, wherein the user interface 69 of the 12th embodiment can be a touch screen 69a, a button 69b, etc. At this moment, the imaging device 1310 collects imaging lights on the image sensor 1320 and outputs electronic signals associated with images to an image signal processor (ISP) 68.

Figure 13C:
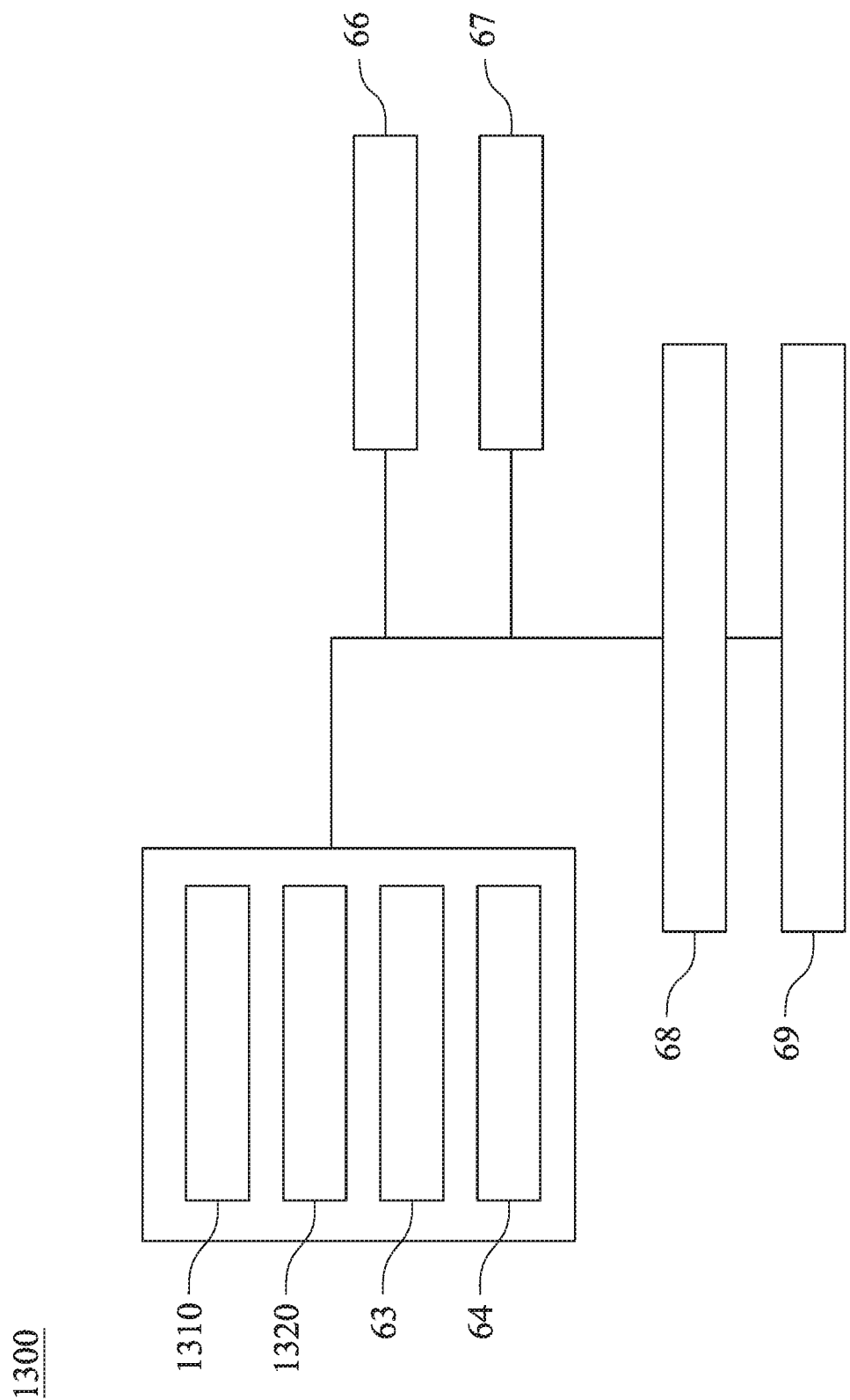
FIG. 13C is a block diagram of the electronic device of the 12th embodiment.

FIG. 13C is a block diagram of the electronic device 1300 of the 12th embodiment, in particular, the block diagram of the camera of the electronic device 1300. In FIG. 13A to FIG. 13C, the electronic device 1300 can further include an auto focus component 63 and an optical anti-shake component 64 in response to the camera specification of the electronic device 1300. Moreover, the electronic device 1300 can further include at least one auxiliary optical element 67 and at least one sensing element 66. The auxiliary optical element 67 can be flash modules, infrared distance measurement components, laser focus modules and modules for compensating for color temperatures. The sensing element 66 can have functions for sensing physical momentum and kinetic energies, such as an accelerator, a gyroscope, and a hall effect element, to sense shaking or jitters applied by hands of the user or external environments. As a result, the auto focus component 63 and the optical anti-shake component 64 disposed on the electronic device 1300 can function to obtain great imaging qualities and facilitate the electronic device 1300 according to the present disclosure to have a capturing function with multiple modes, such as taking optimized selfies, high dynamic range (HDR) with a low light source, 4K resolution recording, etc. Additionally, the user can visually see the captured image of the camera through the touch screen and manually operate the view finding range on the touch screen to achieve the auto focus function of what you see is what you get.

Furthermore, in FIG. 13B, the imaging device 1310, the image sensor 1320, the auto focus component 63, the optical anti-shake component 64, the sensing elements 66, and the auxiliary optical element 67 can be disposed on a flexible printed circuitboard (FPC) 97 and electrically connected with the associated elements, such as an imaging signal processing element 68, via a connector 98 to perform a capturing process. Since the current electronic devices, such as smartphones, have a tendency of being light and thin, the way of firstly disposing the imaging lens module and related elements on the flexible printed circuitboard and secondly integrating the circuit into the main board of the electronic device via the connector can satisfy the mechanical design of the limited space inside the electronic device and the layout requirements and obtain more margins. The auto focus function of the imaging lens module can be controlled more flexibly via the touch screen of the electronic device. In the 12th embodiment, the electronic device 1300 includes a plurality of sensing elements 66 and a plurality of auxiliary optical elements 67. The sensing elements 66 and the auxiliary optical elements 67 are disposed on the flexible printed circuitboard 97 and at least one other flexible printed circuitboard (not labelled particularly) and electrically connected with the associated elements, such as an imaging signal processing element 68, via corresponding connectors to perform a capturing process. In other embodiments (not shown), the sensing elements and the auxiliary optical elements can also be disposed on the main board of the electronic device or carrier boards in other forms according to requirements of the mechanical design and the circuit layout.

In addition, the electronic device 1300 can further include, but not be limited to, a display, a control unit, a storage unit, a random access memory, a read-only memory, or the combination thereof.

13th Embodiment

Figure 14:
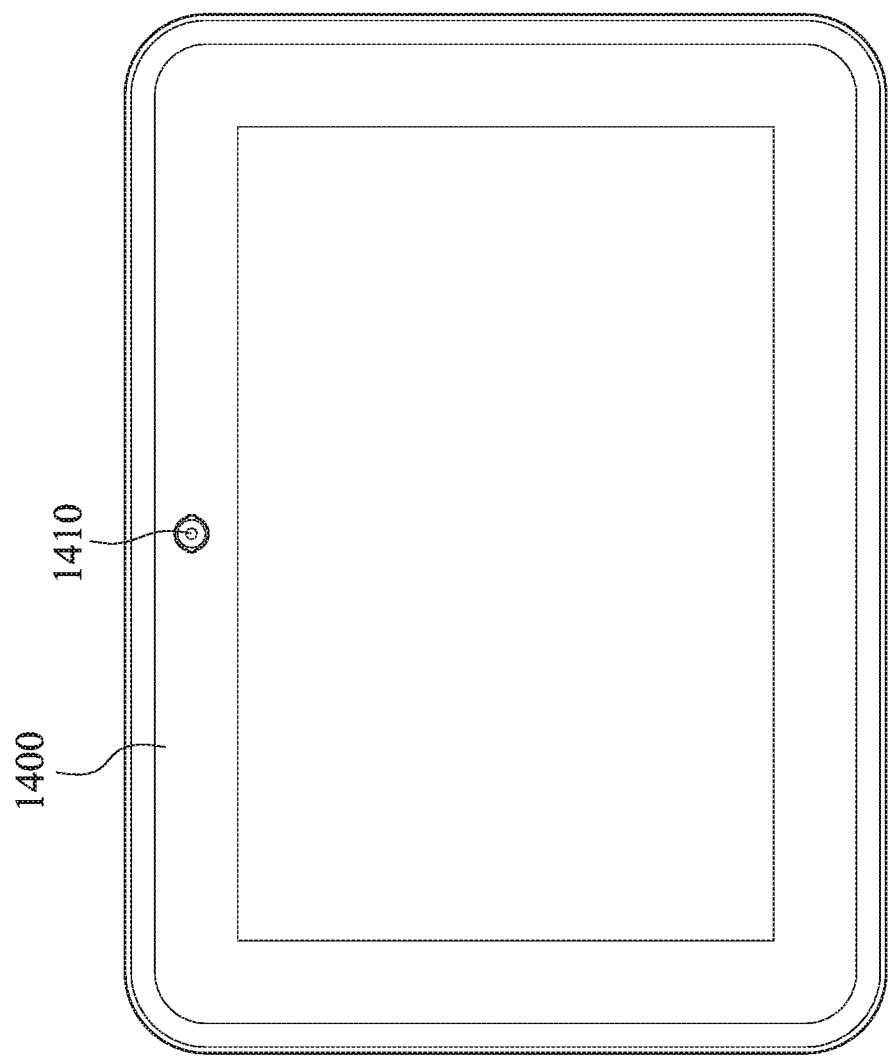
FIG. 14 is a schematic view of an electronic device according to the 13th embodiment of the present disclosure.

FIG. 14 is a schematic view of an electronic device 1400 according to the 13th embodiment of the present disclosure. The electronic device 1400 of the 13th embodiment is a tablet, and the electronic device 1400 includes an imaging device 1410 and an image sensor (not shown), wherein the image sensor is disposed on an image surface (not shown) of the imaging device 1410.

14th Embodiment

Figure 15:
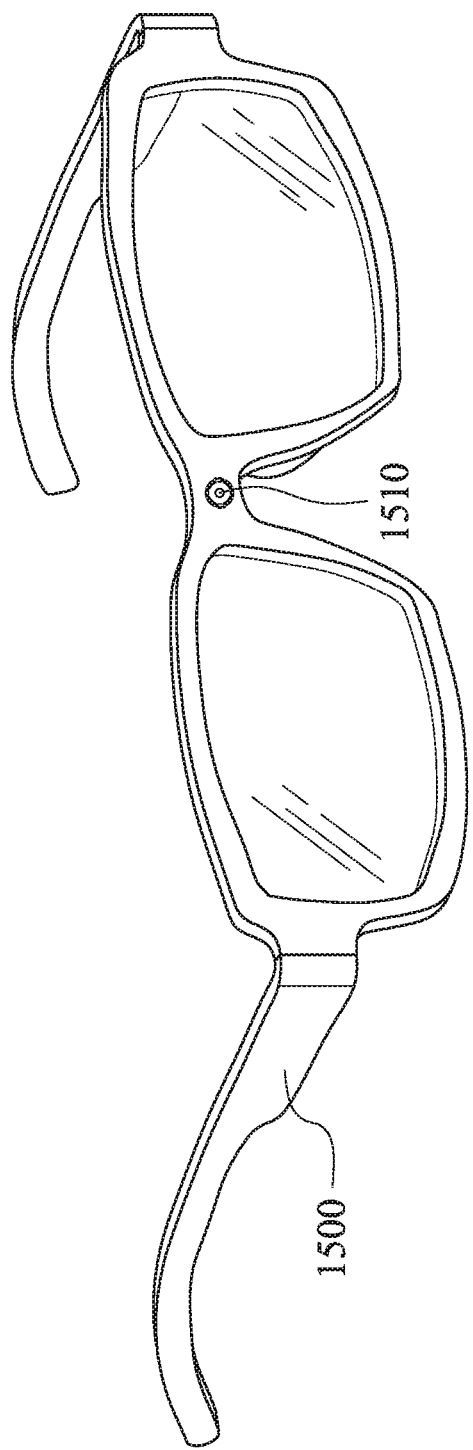
FIG. 15 is a schematic view of an electronic device according to the 14th embodiment of the present disclosure.

FIG. 15 is a schematic view of an electronic device 1500 according to the 14th embodiment of the present disclosure. The electronic device 1500 of the 14th embodiment is a wearable device, and the electronic device 1500 includes an imaging device 1510 and an image sensor (not shown), wherein the image sensor is disposed on an image surface (not shown) of the Imaging device 1510.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A dual-molded optical element, comprising:
   an outer plastic peripheral portion, having an outer annular surface of the dual-molded optical element; and
   an inner sheet portion, enclosed in the outer plastic peripheral portion, and the inner sheet portion forms a central opening, wherein a central axis of the dual-molded optical element runs through a center of the central opening in a direction perpendicular to the opening of the dual-molded circular optical element;
   wherein two sides of the outer plastic peripheral portion are respectively disposed with at least one flat plane, and each of the flat planes is perpendicular to the central axis of the dual-molded optical element;
   wherein one of the flat planes contacts a tapered portion disposed on the outer plastic peripheral portion and located contacting one side of the inner sheet portion, the tapered portion tapers towards the central opening;
   wherein distances between a central cross-sectional plane of the inner sheet portion and the flat planes of the two sides are t1 and t2, and the following condition is satisfied:

$0.2 < t1/t2 < 5.0$;

wherein the inner sheet portion comprises an object-end surface facing an object-end direction and an image-end surface facing an image-end direction, the object-end surface of the inner sheet portion has a first gloss and the image-end surface of the inner sheet portion has a second gloss, wherein the first gloss is different from the second gloss.

2. The dual-molded optical element of claim 1, wherein the outer plastic peripheral portion is a black plastic made by a dual-molded injection molding process.

3. The dual-molded optical element of claim 2, wherein the inner sheet portion comprises a black material containing carbon.

4. The dual-molded optical element of claim 2, wherein the inner sheet portion is integrally formed with the outer plastic peripheral portion via an insert molding process.

5. The dual-molded optical element of claim 2, wherein the distances between the central cross-sectional plane of the inner sheet portion and the flat planes of the two sides are t1 and t2, and the following condition is satisfied:

$0.25 < t1/t2 < 4.0$.

6. The dual-molded optical element of claim 4, wherein a height of the dual-molded optical element parallel to the central axis is t, a diameter of the central opening is $\varphi i$, a thickness of the inner sheet portion is d, and the following condition is satisfied:

$0.5 < (t \times t)/(\varphi i \times d) < 45.0$.

7. The dual-molded optical element of claim 6, wherein the height of the dual-molded optical element parallel to the central axis is t, the diameter of the central opening is $\varphi i$, the thickness of the inner sheet portion is d, and the following condition is satisfied:

$2.0 < (t \times t)/(\varphi i \times d) < 17.0$.

8. The dual-molded optical element of claim 4, wherein a shape of the central opening is non-circular.

9. The dual-molded optical element of claim 1, wherein the outer plastic peripheral portion comprises a stair structure disposed on the outer annular surface, wherein the stair structure has a plane that is perpendicular to the central axis.

10. The dual-molded optical element of claim 1, wherein the outer plastic peripheral portion comprises an object-end surface being one of the flat planes facing an object-end direction and an image-end surface being the other one of the flat planes facing an image-end direction.

11. The dual-molded optical element of claim 10, further comprising a perpendicular parting surface disposed at one of the object-end surface and the image-end surface of the outer plastic peripheral portion, and the perpendicular parting surface is closer to the central axis than the outer annular surface is thereto.

12. The dual-molded optical element of claim 1, wherein the first gloss of the object-end surface of the inner sheet portion is GU1, the second gloss of the image-end surface of the inner sheet portion is GU2, and the following conditions are satisfied:

$0\% < GU1 < 1.8\%$; and $2.0\% < GU2 < 9.0\%$.

13. The dual-molded optical element of claim 1, wherein a maximum outer diameter of the outer annular surface is $\varphi$, a diameter of the central opening is $\varphi i$, and the following condition is satisfied:

$0.4 < \varphi i/\varphi < 0.8$.

14. The dual-molded optical element of claim 13, wherein a thickness of the inner sheet portion is d, the following condition is satisfied:

$$0.2 < (\pi^2 \times d)/t1 < 3.0.$$

15. The dual-molded optical element of claim 13, wherein a surface treatment area is disposed in the outer plastic peripheral portion for making the central opening of the inner sheet portion aligned with the outer annular surface of the outer plastic peripheral portion and coaxial with each other.

16. The dual-molded optical element of claim 15, wherein a surface roughness of the surface treatment area is Ra, and the following condition is satisfied:

$$0.1 \ \mu m < Ra < 3.5 \ \mu m.$$

17. An imaging device, comprising:
a plastic barrel;
an optical lens assembly comprising:
the dual-molded optical element of claim 1;
wherein the optical lens assembly is disposed in the plastic barrel.

18. An electronic device, comprising:
the imaging device of claim 17; and
an image sensor, disposed on an image surface of the imaging device.

* * * * *